United States Patent
Yon et al.

(10) Patent No.: US 8,803,074 B2
(45) Date of Patent: Aug. 12, 2014

(54) DEVICE FOR DETECTION OF ELECTROMAGNETIC RADIATION WITH LOW SENSITIVITY TO SPATIAL NOISE

(75) Inventors: Jean-Jacques Yon, Sassenage (FR); Patrick Robert, Reaumont (FR)

(73) Assignees: Commissariat à l'énergie et aux énergies alternatives, Paris (FR); ULIS, Veurey-Voroize (FR)

( * ) Notice: Subject to any disclaimer, the term of this patent is extended or adjusted under 35 U.S.C. 154(b) by 375 days.

(21) Appl. No.: 13/084,006

(22) Filed: Apr. 11, 2011

(65) Prior Publication Data

US 2011/0290986 A1    Dec. 1, 2011

(30) Foreign Application Priority Data

Apr. 16, 2010  (FR) ..................................... 10 01618

(51) Int. Cl.
*G12B 13/00*   (2006.01)

(52) U.S. Cl.
USPC ...................................................... 250/252.1

(58) Field of Classification Search
USPC .......................... 250/252.1, 332, 338.1–338.4
See application file for complete search history.

(56) References Cited

U.S. PATENT DOCUMENTS

| | | | |
|---|---|---|---|
| 6,011,257 A * | 1/2000 | Endoh | 250/252.1 |
| 6,188,069 B1 * | 2/2001 | Endoh | 250/332 |
| 2001/0003356 A1 | 6/2001 | Yon et al. | |

OTHER PUBLICATIONS

U.S. Appl. No. 14/105,663, filed Dec. 13, 2013, Yon, et al.
U.S. Appl. No. 14/107,106, filed Dec. 16, 2013, Yon, et al.

* cited by examiner

*Primary Examiner* — Seung C Sohn
(74) *Attorney, Agent, or Firm* — Oblon, Spivak, McClelland, Maier & Neustadt, L.L.P.

(57) ABSTRACT

An electromagnetic radiation detection device including multiple elementary detectors grouped into one or more sub-assemblies each including several elementary detectors, where each elementary detector is connected by an interconnection to an impedance-matching device. The impedance-matching device is common to all the elementary detectors of a single sub-assembly, in each sub-assembly the interconnections have roughly the same resistance value.

15 Claims, 9 Drawing Sheets

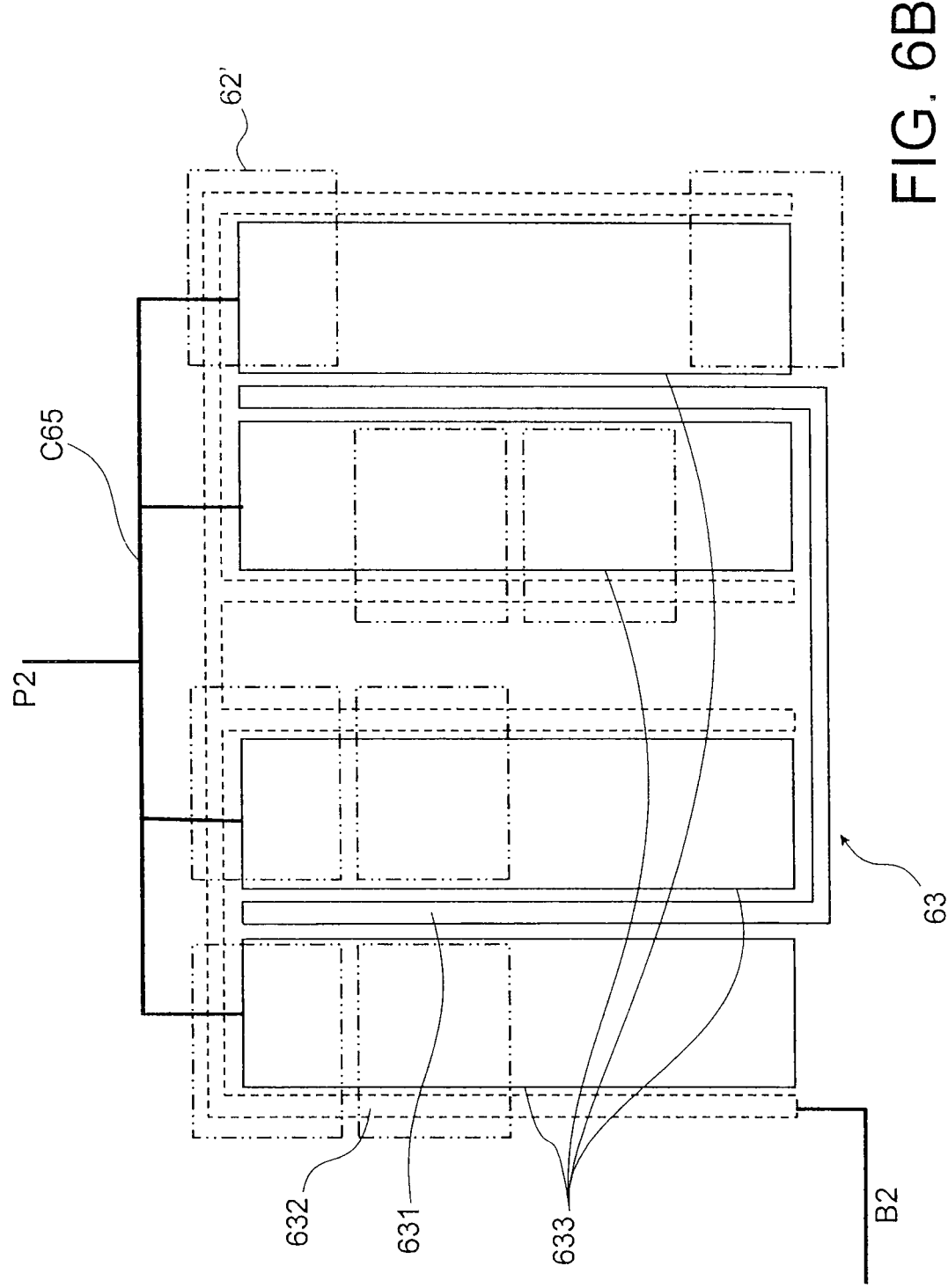

DEVICE FOR DETECTION OF ELECTROMAGNETIC RADIATION WITH LOW SENSITIVITY TO SPATIAL NOISE

TECHNICAL FIELD

The invention concerns the field of devices for detecting electromagnetic radiation. It applies advantageously to the devices for detecting infrared radiation based on bolometers or microbolometers, but it also concerns devices for detecting electromagnetic radiation based on photodiodes or photoconductors. Its field of use covers in particular the production of electronic retinas, also called imagers, which can be form from a large number of elementary detectors. A microbolometer is understood to mean a bolometer at least one dimension of which is micrometric; it concerns in particular a bolometer the production of which uses techniques of microelectronics or micro-technologies and/or nano-technologies.

STATE OF THE PRIOR ART

The most advanced detection devices for the detection and imaging of electromagnetic radiation are based on the use of a matrix of elementary detectors aligned in at least one line and/or at least one column.

An optical system consisting of an assembly of various diopters is generally inserted between a source of radiation which it is desired to detect and a plane containing the elementary detectors. The function of this optical system is to bend the incident rays so as to focus them on the elementary detectors, and to reproduce an image of the source on the detection plane. Each elementary detector thus receives, simultaneously, an element of information which is characteristic of a quantity of electromagnetic radiation received by the device with a particular angle of incidence. The reading of signals delivered by the various elementary detectors of the matrix enables a two-dimensional mapping to be reconstructed, called an image, of the electromagnetic radiation emitted by the source.

In order to make a reading of the signals delivered by the elementary detectors, an electronic circuit having as many inputs of the signal as there are elementary detectors on the detection device is provided. This electronic circuit, called the reading circuit, can consist of an integrated circuit using CMOS or BICMOS microelectronic technology, or using CCD microelectronic technology.

In the following of this document a pixel is defined as comprising a single elementary detector and electrical components specific to this elementary detector connecting this elementary detector to the reading circuit. These electrical components can be interconnections, electrical connections, switches or impedance-matching devices. A pixel can also include a capture and shaping circuit if the latter is specific to a single elementary detector. A pixel interval is defined as being a period between two neighbouring pixels.

The reading circuit and the matrix of elementary detectors can be manufactured either on a single substrate, constituting a monolithic unit, or on two separate substrates, which are then interconnected, and in this case they constitute a hybrid unit.

In addition to polarisation of the elementary detectors, the reading circuit accomplishes three functions for the operation of the detection device:

an impedance-matching function between each elementary detector and the reading circuit, undertaken by the impedance-matching device, a function for capture and shaping of the signal delivered by the elementary detectors, effected by the capture and shaping circuit, a multiplexing of the signals originating from the different elementary detectors in the form of a single electrical signal, generally made by a combination of switches and means of control. The single electrical signal, called the video signal, can then be exploited by a display system.

Other related functions can be included in the reading circuit such as, for example, a function for analog-digital conversion of the video signal.

Forming a reading circuit including the abovementioned three functions (impedance matching, capturing of the signal and multiplexing) is a complicated task that requiring a complex arrangement of the functions. Indeed, the arrangement of the three functions greatly influences the signal/noise ratio and the efficiency of the elementary detectors.

In the case of infrared photovoltaic elementary detectors, the capture and impedance-matching functions and the signal shaping function are generally located within each pixel and therefore close to each elementary detector, in such a way as to allow a more uniform operating point for all the pixels of the matrix, and by this means to reduce the non-uniformities at the scale of the matrix, where these non-uniformities are also called fixed spatial noise.

There are therefore as many impedance-matching devices and capture and shaping circuits as there are elementary detectors in the matrix. In the case of infrared elementary detectors with microbolometers, or photovoltaic detectors for visible wavelengths, the capture and shaping function is generally delocalised to the periphery of the matrix, for example at the end of each of the columns or the lines of the matrix, whereas the impedance-matching function often remains internal to the pixel. The use of microbolometers is advantageous since they function at ambient temperature, whereas elementary detectors with infrared photodiodes often require a cryogenic working temperature close to 77 K.

The multiplexing function is generally distributed between a first part located in the pixel, to undertake a multiplexing within a given column or a given line, and a second part, advantageously located at the base of the column, or respectively the end of the line, to undertake a multiplexing of the different columns of the matrix, or respectively of the different lines. A configuration in which the multiplexing is undertaken only within the pixel is also possible.

A few methods enabling an electrical coupling of a photovoltaic infrared elementary detector to be made with a reading circuit are described in article [1], the complete references of which are given at the end of the description.

Among the different solutions studied, it becomes clear that the impedance-matching function is advantageously undertaken by MOS transistors in a common gate assembly, also called direct injection, as due to high levels of current flowing in the elementary detectors in their habitual condition of use.

FIG. 1 illustrates an electrical diagram of a pixel 1 formed from an elementary detector 2, of the infrared photodiode type, coupled in series with an impedance-matching device 3 of the directly injected impedance-matching transistor type, having a source and a drain. The anode of the photodiode 2 is connected to an input terminal of the impedance-matching device, in this case the source of the matching transistor 3. This assembly has a low input impedance, which is expressed here as the inverse of the transconductance value of the matching transistor 3. This transconductance value depends on the polarisation current I traversing the matching transistor 3.

Direct injection assembly enables an impedance-matching device of small size to be obtained, having only a single matching transistor 3 for each elementary detector 2. It is thus possible to easily incorporate the impedance-matching function in pixels of small size, which is not the case, for example, with amplifier-based impedance-matching assemblies.

In order to be more efficient, the electromagnetic radiation detection device requires properties of linearity and uniformity of sensitivity, and direct injection assembly enables these properties to be improved.

However, the integration and miniaturisation constraints imposed by the geometry of the pixel must be taken into account. Since the size of the pixels tends to become smaller with each new product generation, the impedance-matching device has increasingly limited space with each technological generation.

Article [2], the references of which are given at the end of the description, shows elementary detectors of the microbolometer type cooperating with impedance-matching transistors in a directly injected assembly. This assembly is chosen since the sensitivity of a microbolometer is proportional to the current which traverses it, and this current is called the reading current.

FIG. 2 illustrates a device for detecting electromagnetic radiation using a method of reading of elementary detectors 22, 220 of the microbolometer type by direct injection assembly of matching transistors 23, 230, of the PMOS type, assembled in a common gate and associated with each elementary detector 22, 220.

The detection device includes multiple pixels, two of which, 21, 210, have been represented here. Each pixel includes an elementary detector 22, 220 formed by a microbolometer, having an electrical resistance varying with an incident electromagnetic radiation to which it is exposed, where a matching transistor 23, 230, in the example described of PMOS type, fulfils the impedance-matching function and a switch 24, 240.

The microbolometers 22, 220 are connected by a first terminal to an input terminal of the impedance-matching device 23, 230 of their respective pixel 21, 210. Since the impedance-matching device 23, 230 is a matching transistor, having a source and a drain, the microbolometers 22, 220 are each connected to the source of the matching transistor 23, 230 of their respective pixel 21, 210. The microbolometers 22, 220 are connected by a second terminal to a first common voltage source P1, which delivers, through a connection C1, a reading current Ids traversing the microbolometers 22, 220. The drains of the PMOS transistors 23, 230 are connected respectively to a first terminal of the switches 24, 240; second terminals of the said switches 24, 240 are connected to a common read bus B1. The read bus B1 is connected to a circuit 5 for capture and shaping of the signal delivered by the elementary detectors 22, 220. The switches 24, 240 enable a given pixel of the read bus B1 to be isolated.

The capture and shaping circuit 5 traditionally includes an operational amplifier 51 having an inverting input connected to the bus B1, a non-inverting input connected to a voltage source 54 and an output. A condenser 52 is installed between the inverting input and the output of the operational amplifier 51. A switch 53 is installed in parallel with the condenser 52.

The gates of the matching transistors 23, 230 are connected in common through an electrical connection C2, to a second voltage source P2 which is adjusted so as to guarantee saturated operation of the matching transistors 23, 230. Saturated operation enables a low input impedance, as sought, to be obtained.

In such an assembly, when one of the switches 24, 240 is closed, a reading current Ids is established between the first voltage source P1 and the read bus B1, the amplitude of which is modulated by a resistance value of the microbolometer 22, 220 traversed by the reading current Ids. The resistance of the microbolometer 22, 220 depends on the incident electromagnetic radiation.

The switches 24, 240 can be closed sequentially such that only a single microbolometer 22, 220 is connected to the capture and shaping circuit 5 at once. This forms a single electrical signal which represents a temporal multiplexing of the reading currents Ids traversing the different pixels 21, 210. This therefore forms a temporal multiplexing of signals delivered by the elementary detectors which use the same read bus B1 and are generally positioned in a given column or a given line. This mode of operation is commonly called "rolling shutter" operation.

A base-clipping device 6 may be included; its function is to eliminate a part of the reading current Ids, called the common mode current, which flows over the read bus B1 without carrying any information concerning the electromagnetic radiation received. The elimination of the common mode current, also called base-clipping, enables the signal capture and shaping circuit 5 to be given greater sensitivity. In what follows we shall call Ids the reading current flowing in the read bus B1 and in an elementary detector 22, 220 at the time when this said elementary detector 22, 220 is read.

In the case of the microbolometers, the common mode current greatly depends on an average temperature of the detection device during use. The base-clipping device 6 mainly consists of a control resistance 61, consisting of a microbolometer of the same kind as the elementary detectors 22, 220, but which is less sensitive to electromagnetic radiation. The control resistance 61 has a terminal connected by a transistor 62, in the example described of the NMOS type, to the read bus B1 and another terminal connected to a low-impedance voltage source 63 which may, for example, be earth. The transistor 62 of the base-clipping device has a gate connected to a voltage source (not represented), adjusted so as to guarantee saturated operation of the transistor 62 in order to obtain the low impedance sought at the input of the capture and shaping circuit 5.

This type of microbolometer 61, called a blind microbolometer, offers the possibility of making a differential reading with the resistor of each elementary detector 22, 220. The differential reading enables the resistance variations common to all the microbolometers 22, 220, 61 to be cancelled. In particular this enables the resistance variations due to average temperature variations, common to the entire detection device, to be ignored.

The base-clipping device 6 is common to the different elementary detectors 22, 220 which use the same read bus B1. When a switch 24, 240 is closed, the current flowing in the read bus B1 is equal to the reading current Ids flowing in the elementary detector 22, 220 read. The NMOS transistor 62 and the blind microbolometer 61 derive a large part of the common mode current from the said reading current Ids traversing the microbolometer 22, 220 of the pixel 21, 210. The result is that the capture and shaping circuit receives a current in which current variations, called the signal delivered by the elementary detector 22, 220, resulting from the resistance variations due to the electromagnetic radiation, are proportionally amplified.

Since less elementary detectors 22, 220 have a signal-to-noise ratio, the performance of the electromagnetic radiation detection device is measured by its ability to reproduce the signal-to-noise ratio of the elementary detectors 22, 220 whilst minimising degradations which are inherent to the capture and shaping circuit 5, to the matching transistors 23, 230 and to the layout of the elementary detectors 22, 220.

The performance of such a device is also estimated by means of a quality of reproduction of the signals delivered by the elementary detectors. The quality of reproduction is characterised, in the case of elementary detectors of the microbolometer type, for example, by the ratio of the Ids reading current variation caused by the electromagnetic radiation, to a variation of the current, obtained for a short circuit detector, which therefore has a zero read impedance, which is called the detector's intrinsic signal. This ratio, also called the injection efficiency Eta, is expressed by the following relation:

$$Eta = (G_m \times R_d)/(1 + G_m \times R_d) \quad \{1\}$$

Where $G_m$ is the transconductance of the directly injected matching transistor 23, 230 and $R_d$ a resistance value of the microbolometer.

Relation {1} shows that an injection efficiency close to 100% can be obtained in the event that the inverse of the transconductance of the matching transistor 23, 230 is very much lower than the resistance of the microbolometer 22, 220.

If it is desired to obtain a low noise level an injection efficiency of a high value must be produced.

Indeed, the noise $I_{n\text{-}total}$ input into the capture and shaping circuit 5 results principally, firstly, from an $I_{n\text{-}bolo}$ noise inherent to the microbolometer 22, 220 and secondly from an $I_{n\text{-}tmos}$ which is intrinsic to the matching transistor 23, 230, according to the following relation:

$$I_{n\text{-}total} = \sqrt{(Eta \times I_{n\text{-}bolo})^2 + ((1-Eta) \times I_{n\text{-}tmos})^2} \quad \{2\}$$

For a 100% injection efficiency, the entire intrinsic signal of the elementary detector 22, 220 is transmitted to the capture and shaping circuit 5, where the signal delivered in the reading current Ids has the value of the intrinsic signal, and relation {2} shows that the noise input into the capture and shaping circuit 5 is equal to the noise of the microbolometer 22, 220. In this situation, therefore, the signal-to-noise ratio of the elementary detector 22, 220 is perfectly reproduced.

Conversely, for an injection efficiency Eta of less than 100%, not only is a weaker delivered signal at the input to the capture and shaping circuit 5 observed but, additionally, a larger contribution of the intrinsic noise $I_{n\text{-}tmos}$ of the matching transistor 23, 230 in the $I_{n\text{-}total}$ is observed. This combination of effects leads to a substantial degradation of the signal-to-noise ratio.

When the resistance of the microbolometers 22, 220 becomes too low, less than or equal to the inverse of the transconductance of the matching transistor 23, 230, the injection efficiency Eta becomes too low for satisfactory use of the detection device.

When the matching transistor 23, 230 has an intrinsic noise $I_{n\text{-}tmos}$ which is appreciably greater than the inherent noise of the microbolometer $I_{n\text{-}bolo}$, due, for example, to the appearance of a 1/f noise in the matching transistor 23, 230, the signal-to-noise ratio of the detection device is degraded.

Relation {3} describes an evaluation of the 1/f noise intrinsic to a matching transistor having a gate of width W and of length L, where this noise is called $I_{n\text{-}tmos\text{-}1/f}$.

$$I_{n\text{-}tmos\text{-}1/f}^2 = (K_F \times I_{ds}^{Af})/(W \times L) \quad \{3\}$$

Relation {3} shows that a substantial 1/f noise can appear when the area of the gate, i.e. the product of the length L multiplied by the width W, becomes small, or alternatively when the reading current Ids traversing the matching transistor 23, 230 becomes too great, or again when parameters Kf and Af, which are characteristic of the MOS technology used, are too high.

These particular situations occur more critically, and in combined fashion, with the development of advanced technological generations of electromagnetic radiation detection devices including pixels which are small in size.

In the remainder of the description a main area of an elementary detector designates an area of the elementary detector enabling an electromagnetic radiation to be detected. Such an area is often designated as being a sensitive area of the electromagnetic detector.

A reduction of the size of the pixel 21, 210 leads to a reduction of the main area of the detector, and therefore to a reduction of intensity of the electromagnetic radiation received by each elementary detector 22, 220. This causes a reduction of sensitivity. This reduction of sensitivity may be compensated by an increase of the reading current Ids in the microbolometer 22, 220.

However, an increase of the reading current Ids concomitantly increases the 1/f noise level of the matching transistor 23, 230, as is shown by relation {3}.

The reduction of the size of the pixel 21, 210 is generally accompanied by a reduction of the supply voltages, since their design can use latest-generation CMOS technologies, in which the available voltages are lower.

To compensate for this reduction of the supply voltages, the value of the resistance of the microbolometers 22, 220 must be reduced proportionately. According to relation {1}, this leads to a reduction of the injection efficiency Eta.

Lastly, the reduction of the size of the pixels 21, 210 causes a reduction of the size of the matching transistors 23, 230 located in the said pixels 21, 210. Accordingly, the width W and/or the length L of the gates of these transistors is/are reduced. According to relation {3}, this causes an increase of the level of 1/f noise of the matching transistor.

A reduction of the size of the matching transistor 23, 203 also has the disadvantage that it introduces a greater dispersion of their threshold voltage which will be reflected in a greater spatial noise in the detection device.

The patent referenced [3] describes an architecture of an electromagnetic radiation detection device formed as a matrix of microbolometers, in which a directly injected matching transistor is located at the end of the column in each column of the matrix, and is connected to all the elementary detectors of the said column by a read bus. This arrangement enables the geometrical constraints imposed by the size of the pixels to be overcome, and therefore in theory enables a matching transistor to be designed which has a gate area which is wider than if the matching transistor was located in, or positioned vertically above the said pixel, having an area limited by that of the pixel.

However, the said matching transistor is common to a column of elementary detectors of the microbolometer or bolometer type, and a residual resistance is therefore introduced between the elementary detector and the matching transistor. The residual resistance is partly due to the read bus located between each microbolometer and the source of the matching transistor. This series resistance is inevitable, since it is related to dimensions of the read bus which are unnecessarily reduced in order to be able to fit the bus in the pixel interval.

The effect of this series resistance is to displace all operating points of the microbolometer, and to reduce its sensitivity.

In addition, this series resistance is different for each of the detectors in the column, since each elementary detector is at a different distance from the matching transistor. This architecture therefore introduces a gradient of operating points and a gradient of sensitivity along the length of the matrix. This causes an additional spatial noise, along the columns, in addition to any spatial noise which is already present. In addition a columnar noise is formed, since each matching transistor is common to one column, and induces an inherent noise which contributes to the differentiation of the columns from one another.

Lastly, the possible increase of the dimensions of the matching transistors is limited to a width of column of elementary detectors, since certain design rules linking the length and the width of the transistor must be applied in order to limit the noise of the transistors. Thus, a reduction of the dimensions of the elementary detectors cannot necessarily be compensated in terms of noise and efficiency by this solution.

DESCRIPTION OF THE INVENTION

The aim of the present invention is to propose a device for detecting electromagnetic radiation which includes an impedance-matching device able to restore a high signal-to-noise ratio for several elementary detectors, notably for integrated elementary detectors, arranged in a matrix consisting of lines and columns. The matrix consists of pixels as defined above, each including several elements, one of which is an elementary detector. The aim of the invention is to provide a solution to the difficulties and limitations relating to a degraded signal-to-noise ratio and to a reduction of dimensions of the pixels.

Another aim of the invention is to offer an electromagnetic radiation detection device which minimises all fixed spatial noise originating either from dispersions of characteristics of the elements of the pixel, or from dispersions of characteristics of elements common to a given column or a given set of pixels. The device according to the invention also has the advantage that it enables the elementary detectors to have an increased reading current, in order to obtain an improved sensitivity, without introducing any significant noise originating from the impedance-matching devices which are connected to the elementary detectors.

The invention also enables an electromagnetic radiation detection device to be produced which is able to use advanced MOS technologies, leading to dimensions of elementary detector and electrical connections which are as small as possible, without being penalised by low supply voltages such as are often found in these technologies.

Finally, another aim of the invention is to offer an electromagnetic radiation detection device which has simplified pixels including a smaller number of elements required for their operation.

The invention therefore concerns an electromagnetic radiation detection device including multiple elementary detectors grouped into one or more sub-assemblies, each including several elementary detectors. Each elementary detector is connected by an interconnection to an impedance-matching device. The device according to the invention is characterised in that:

the impedance-matching device is common to all the elementary detectors of a single sub-assembly, in each sub-assembly the interconnections have roughly the same resistance value.

In addition, in the remainder of the description, the elementary detectors are defined as being connected to an input terminal of the impedance-matching device, and not as being able to be connected at any particular point of the impedance-matching device.

By pooling in this manner the impedance-matching devices between several elementary detectors it is possible to have an impedance-matching device the size of which is greater than that which it would have had if there had been one impedance-matching device for each elementary detector. In this way, all noise relating to the size of the impedance-matching device is reduced in comparison.

In addition, a roughly identical resistance value for all the interconnections in a given sub-assembly enables a residual impedance due to the interconnection to be roughly identical for each pixel in a given sub-assembly.

If there are several sub-assemblies having a matching transistor in the detection device, then all the pixels in the detection device have a roughly identical impedance.

In this way, since each sub-assembly of elementary detectors is connected to a read bus through the impedance-matching device, the read bus is traversed by a reading current which includes, among other things, a fixed component element having a fixed current dependant on a fixed impedance which is roughly identical for each elementary detector, taking into account the resistance of its interconnection. The said reading current flowing in the read bus also includes a variable component element, called the signal delivered by an elementary detector, which is a current variation of the said current dependant on a variation of resistance of the elementary detector. This variation of resistance is due to an interaction between an elementary detector and incident electromagnetic radiation on the elementary detector. Since the fixed impedance is roughly identical for all elementary detectors, it becomes easy to identify the proportion of the reading current due to the electromagnetic radiation, independently of the current's fixed component element.

The elementary detectors can be bolometers or microbolometers, photodiodes or photoconductors. The elementary detectors are preferably microbolometers. It is thus possible to use substantial reading currents, and to work at ambient temperature.

When the elementary detectors are photodiodes it may be advantageous for the impedance-matching device to be connected to a capture and shaping circuit common to all the elementary detectors of a single sub-assembly. The capture and shaping circuit can then be located in a position very close to the elementary detectors, whilst maintaining dimensions suitable for correct operation. This pooling by the elementary detectors enables a sufficiently large space to be released to manufacture the capture and shaping circuit in the area of the elementary detectors, and does not require it to be consigned to the end of the column, nor for it to be pooled between several sub-assemblies.

Conversely, whether the elementary detectors are of the microbolometer or photodiode type, the impedance-matching device can advantageously be connected to a capture and shaping circuit common to several sub-assemblies, and located, for example, at the end of a column or line. This enables the capture and shaping circuits to be pooled, and the manufacture of the matrix of elementary detectors to be simplified. In addition, this leaves a larger area available to manufacture a larger impedance-matching device than if the capture circuit were connected to a single sub-assembly. In this case, the read bus advantageously connects each impedance-matching device to the capture and shaping circuit.

Each elementary detector is preferably in series with a switch which is specific to it, with the switches of a given sub-assembly adopting a closed position in sequential fashion, such that a read bus connected to the impedance-matching device receives a signal originating from only a single elementary detector at once. The said signal is quickly modified by transiting the elementary detector, according to the electromagnetic radiation to which it is exposed. It is then possible to produce a sequential multiplexing between the various signals originating from the different elementary detectors.

The impedance-matching device is preferably a directly injected transistor operating in saturation, called a matching transistor. The elementary detectors are then connected to a source electrode of the matching transistor from a first terminal present on the elementary detector. Indeed, in this case, the input terminal of the impedance-matching device is the source of the matching transistor. It is thus possible to simplify the electromagnetic radiation detection device, and a single transistor is used to accomplish an impedance-matching function. The sensitivity and linearity of the detectors are improved, since the variations of resistances seen by the bus are limited.

The elementary detectors advantageously define the first plane, different from a second plane including the impedance-matching device. The two planes are one above the other. The impedance-matching device is preferably facing at least a number of the elementary detectors. In addition, the impedance-matching device is preferably facing at least a part of each elementary detector. If the impedance-matching device is a directly injected transistor it is thus possible to manufacture transistors having a larger gate area than if the matching transistor were in the same plane as the elementary detector.

Whether the matrix of elementary detectors is manufactured from the same substrate as the impedance-matching device, or on a second substrate, it is possible to manufacture the impedance-matching devices in a plane different from the plane of elementary detectors. Thus, an increase of the area of the impedance-matching device does not cause a reduction of area of the elementary detectors as a consequence. This enables pixels of areas roughly equal to the area of an elementary detector to be obtained.

Since several elementary detectors are connected to a given impedance-matching device, an impedance-matching device may preferably extend face to several elementary detectors, or have an area greater than a main area of an elementary detector. Since the impedance-matching device is a matching transistor, it may advantageously have a gate area greater than a main area of an elementary detector of the sub-assembly.

Lastly, it is possible to manufacture impedance-matching devices having an area roughly equal to a combined area of the main areas of the elementary detectors of a given sub-assembly. Since the impedance-matching device is a matching transistor, it advantageously has a gate area greater than an area corresponding to a sum of the main areas of several elementary detectors of a given sub-assembly.

These two advantageous conditions are also valid if, with the matching transistor located in the second plane, different from the first plane containing the elementary detectors, the main area of an elementary detector represents most of the area of a pixel.

Depending on the state of the art, when there is one matching transistor for each pixel, the gate area is less than the area of the pixel. Indeed, even if the matching transistor is located in the second plane, different from the first plane containing the elementary detectors, the matching transistor has a source, a drain and also electrodes and interconnections which must also be in the second plane. The gate of the matching transistor according to the state of the art therefore generally has an area less than that of a pixel.

Having a large gate area causes a low 1/f noise in the matching transistor, and this enables the matching transistor to be traversed by a central reading current, producing a low intrinsic noise. It is therefore possible, even in microelectronics technologies leading to small pixel dimensions or small elementary detector dimensions, to obtain elementary detector sub-assemblies with a low 1/f noise, and a high injection efficiency.

In such a way as to obtain resistance roughly equal values of the interconnections, where each connects the impedance-matching device to an elementary detector, the interconnections may be of roughly identical dimensions.

If this is not the case, if the dimensions are not identical, at least one interconnection advantageously has a higher or lower resistance, compared to the resistance which it would have had if it connected the elementary detector to the input terminal of the impedance-matching device by as short a path as is possible in microelectronics technology, with at least one elementary detector being further from an input terminal of the impedance-matching device than another elementary detector of the same sub-assembly.

In this manner it is possible to form interconnections having roughly equal resistances, without however elementary detectors being located at a roughly equal distance from an input terminal of the impedance-matching device, for example a source electrode. It is thus possible to manufacture an optimum impedance-matching device without taking account of a possible layout of its elementary detectors. This may be simpler than configuring the impedance-matching device as a complicated shape such that an input terminal, for example the source electrode, may have a part at a roughly identical distance from each elementary detector.

In microelectronics technology the shortest possible path between two points is different from the geometrically shortest possible path. Indeed, in microelectronics, it is necessary to bypass at least every element present between the two abovementioned points. In addition it is necessary to bypass them without coming into contact with other elements. Additionally, in microelectronics, design rules are applied the purpose of which is to prevent the different elements present around a given location from being too close to one another. A safety distance must be left between the different elements so as to prevent a short circuit or leakage currents. Lastly, in microelectronics, if it is possible to make connections outside a plane parallel to the first plane defined by the elementary detectors, these connections are made of vertical connections and connections contained in planes parallel to the first plane; it is generally not possible to make connections having an angle appreciably different from 0° or 90° relative to a normal to the first plane.

If an elementary detector is further from the impedance-matching device than another elementary detector of the same sub-assembly, it is advantageous that at least one interconnection of a given length, connecting the impedance-matching device to an elementary detector, should have, on at least one part of its length, a section different from the section of at least one part of another interconnection connecting the impedance-matching device to another elementary detector of the same sub-assembly. In the part of section different from the section of another interconnection the interconnection has one resistance for each unit of length different from that of the other interconnection. Thus, it is possible artificially to increase or reduce the resistance of the interconnection. It is therefore possible to connect to an impedance-matching device elementary detectors located at different distances from the input terminal of the impedance-matching device by means of interconnections having different lengths, but roughly equal resistances.

In this situation, if it is necessary to increase the resistance of an interconnection connecting the impedance-matching device to an elementary detector, the interconnection, having an increased resistance and a given length, advantageously has a narrowing of its section over at least a part of its length.

Such a partial narrowing of section may enable the resistance of an interconnection requiring it to be modified, without however lengthening this interconnection. Indeed, if it is possible to lengthen an interconnection, compared to the shortest possible path, so as to increase its resistance, this causes a formation of additional interconnection lengths. It then becomes more difficult to calculate and design the shortest possible path for neighbouring interconnections.

According to the invention, the elementary detectors are positioned in a matrix including lines and columns of elementary detectors. In this way, the sub-assembly may include different elementary detectors located on several lines, and different elementary detectors located on several columns of the matrix.

This enables a columnar component element and a linear component element of a spatial noise of the matrix to be reduced at once. Indeed, this situation implies, advantageously, that a first sub-assembly is connected to a read bus different from the read bus connected to at least a second sub-assembly having an elementary detector in a line of the matrix which is the same line as an elementary detector of the first sub-assembly. And, in addition, the first sub-assembly is generally connected to a read bus different from the read bus connected to at least a third sub-assembly having an elementary detector in a column of the matrix which is the same column as an elementary detector of the first sub-assembly.

In particular, if the capture and shaping circuit is common to several sub-assemblies, no noise due to the said capture and shaping circuit creates any columnar noise, since the capture and shaping circuit is connected to elementary detectors present in different lines and columns of the matrix, and since it is not connected to all the elementary detectors of a given line, nor to all the elementary detectors of a given column.

Alternatively, the sub-assembly may include different elementary detectors located on several lines and on a single column, or different elementary detectors located on several columns and on a single line of the matrix. In this case, the sub-assembly represents a fraction of a line or of a column of the matrix. In this situation, the linear or columnar spatial noise is reduced only in the direction in which the read bus is conveying a signal originating from various sub-assemblies, and not from a single sub-assembly device.

It is possible, advantageously, in all cases, to reduce the columnar spatial noise if sub-assemblies having elementary detectors located on a given line or column of the matrix are connected to different read buses.

In an interesting embodiment of the invention the elementary detectors of a given sub-assembly are arranged according to an axial symmetry of a given order. This enables the formation of the interconnections and the formation of the input terminal of the impedance-matching device to be facilitated. It is useful in particular if it is desired that the interconnections of a given sub-assembly should have roughly identical dimensions. It is also useful if it is desired that, for each elementary detector, there should be at least one point of the input terminal, for example a point of a source electrode, which is located at a given distance which is roughly identical for each elementary detector.

BRIEF DESCRIPTION OF THE DRAWINGS

The invention will be better understood, and other details, advantages and characteristics of it will appear, on reading the following description given as a non-restrictive example, and with reference to the appended illustrations, in which:

FIGS. 6A and 6B are simplified partial plane views of an electromagnetic radiation detection device according to another embodiment of the invention including sixteen elementary detectors in a sub-assembly;

Identical, similar or equivalent parts of the different figures have the same numerical references, to facilitate changing from one figure to another.

The different parts represented in the figures are not necessarily represented with a uniform scale, in order to make the figures more readable.

The illustrative figures of the different embodiments of the device according to the invention are given as examples, and are not restrictive.

DETAILED DESCRIPTION OF SPECIFIC EMBODIMENTS

Figure 3:
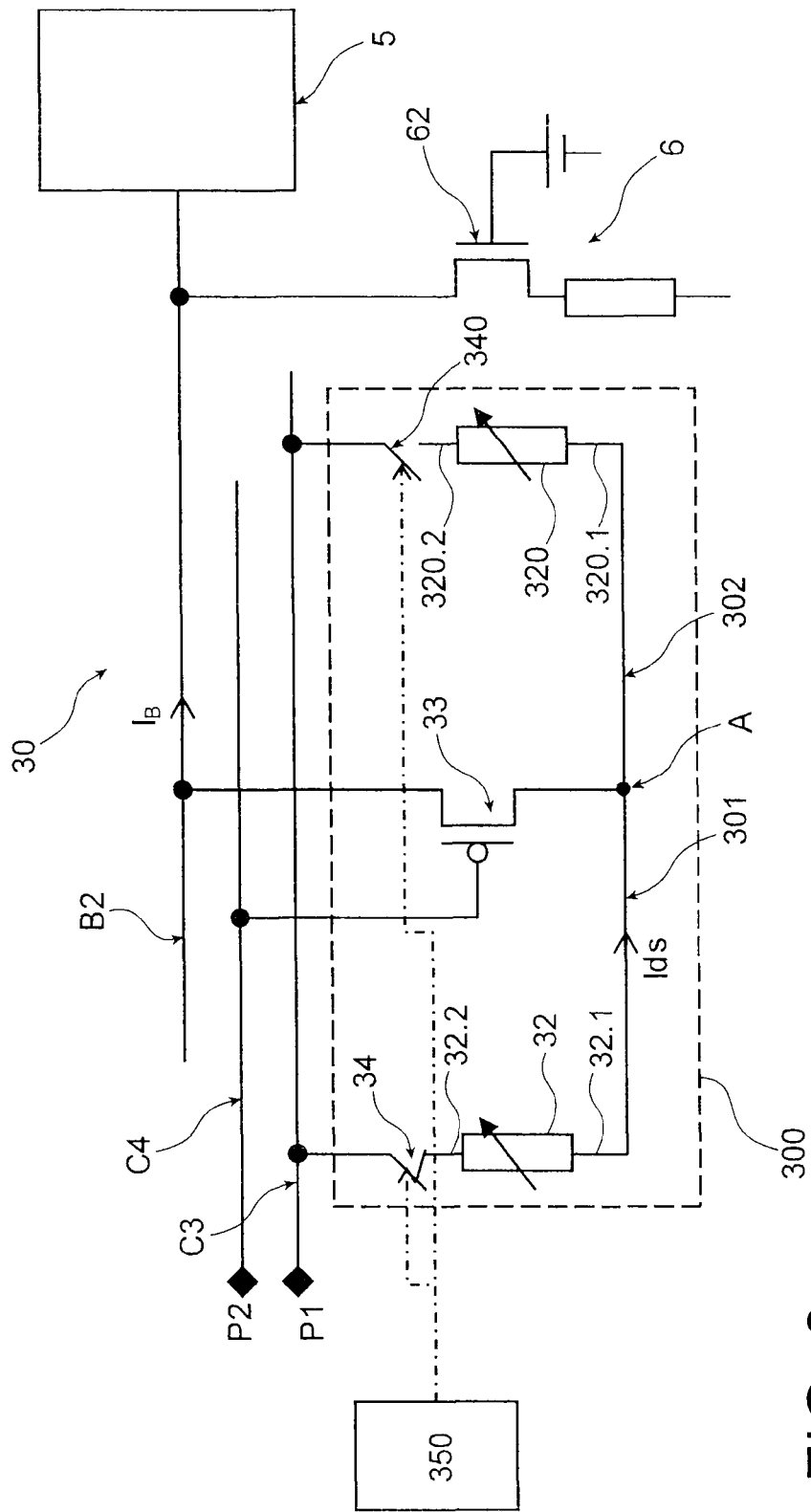
FIG. 3 illustrates a partial electrical diagram of an electromagnetic radiation detection device according to a first embodiment of the invention.

The description of the invention will be better understood in light of FIG. 3 illustrating a particular embodiment of the invention.

FIG. 3 represents a simplified electrical diagram of an electromagnetic radiation detection device 30 including multiple elementary electromagnetic radiation detectors 32, 320, preferably arranged in a matrix with at least one line and/or at least one column. The elementary detectors 32, 320 are grouped into one or more sub-assemblies 300, each including several elementary detectors, and a single sub-assembly 300 is represented in FIG. 3.

In the remainder of the description, according to the definition given above, a pixel will designate a unit formed from an elementary detector, a switch and various electrical connections which are specific to this elementary detector and to this switch.

In addition, it will be considered that the elementary detectors are arranged with one another with a given interval for the columns and another given interval for the lines, where this other interval is different from or identical to the interval of the columns. An area defined by the interval for a column and the interval for a line of the matrix is called the area of a pixel.

Lastly, it will be considered that the elementary detectors are connected to an input terminal of an impedance-matching device, and not to a particular point of the latter. In addition, if the impedance-matching device is a matching transistor, having a source and a drain, the source is considered to be the input terminal.

Each sub-assembly 300 of elementary detectors therefore includes several elementary detectors 32, 320; in this case it includes two such, on the same line.

In addition to the elementary detectors 32, 320, each sub-assembly 300 includes a single impedance-matching device 33, preferentially an MOS transistor 33, assembled as a common gate, called a matching transistor 33.

However, the impedance-matching device may also be any type of transistor having a low input resistance, for example a bipolar transistor assembled with a common base (more commonly known by its acronym J.E.T.), or be an operational amplifier with a trans-impedance assembly, where the said operational amplifier has a low input impedance, or may be any other type of impedance matching known to the skilled man in the art which is compatible with the technological constraints relating to the invention.

The matching transistor 33 is assembled with direct injection and is able to produce an impedance matching between the elementary detectors 32, 320 and a circuit 5 for capture and shaping of signals delivered by the elementary detectors 32, 320; this capture and shaping circuit 5 may possibly be common to several sub-assemblies 300. The elementary detectors 32, 320, are preferably microbolometers, operating at ambient temperature, and sensitive to an electromagnetic radiation, for example infrared radiation. As a variant, these could be photodiodes or photoconductors.

Alternatively, in another embodiment of the invention, particularly in the case of elementary detectors 32, 320 of the photodiode type allowing detection of electromagnetic radiation in the visible spectrum, the capture and shaping circuit 5 is integrated with the impedance-matching device 33, which is common with a single sub-assembly 300. The read bus B1 then connects several capture and shaping circuits 5 to a single circuit allowing an analysis of the signals and the formation of a video signal.

In the embodiment illustrated in FIG. 3 the elementary detectors 32, 320 consist of microbolometers and each sub-assembly 300 is defined as having an impedance-matching device 33 common to all the elementary detectors 32, 320 of the sub-assembly. In addition, the capture and shaping circuit 5 is common to several sub-assemblies 300.

Each sub-assembly 300 includes, in addition, switches 34, 340, each one being associated with an elementary detector 32, 320. Switches 34, 340 are, for example, transistors used as a switching circuit.

The matching transistor 33 of each sub-assembly 300 may be an P-type MOS, as represented in FIG. 3, or of N-type, or a transistor of the bipolar type. In the latter two cases, polarisation voltages applied to the electromagnetic radiation detection device will be modified accordingly. The matching transistor 33, and all the matching transistors presented below, are considered to have a gate, and to have a source and a drain in electrical contact with, respectively, a source electrode and a drain electrode. The gate is of length L and of width W, the product of which defines a gate area.

Each elementary detector 32, 320 is connected by a first terminal 32.1, 320.1 to the source electrode of the matching transistor 33 of the sub-assembly 300 concerned, by means of an interconnection 301, 302. The first terminals 32.1, 320.1 of the elementary detectors 32, 320 of a given sub-assembly 300 are connected to one another, and also to the source electrode of a given matching transistor 33 as a common node A. According to the invention, the interconnections 301, 302 connecting each elementary detector of a sub-assembly with the matching transistor 33, of which is there is one only, have roughly the same electrical resistance value. It is known that the resistance of an interconnection is proportional to a resistivity of the material constituting it, and to a length of interconnection, and is inversely proportional to a transverse section of the interconnection.

Each elementary detector 32, 320 of the sub-assembly 300 of elementary detectors is connected by a second terminal 32.2, 320.2 to one of the switches 34, 340, which enables it to be connected to a first voltage source P1 or to isolate it from the first voltage source P1. The first voltage source P1 may be internal or external to the electromagnetic radiation detection device 30 and enables a reading current to be delivered, which is required to read a variation of resistance of the elementary detectors 32, 320 under the influence of an electromagnetic radiation, corresponding to the signal delivered by the elementary detector 32, 320. The first voltage source P1 is connected to each switch 34, 340 through an electrical connection C3. Alternatively, the switch 34, 340 may be located on the interconnection connecting the elementary detector 32, 320 to the impedance-matching device 33.

The drain electrode of the transistor 33 is connected to a read bus B2, which is connected to the capture and shaping circuit 5, and preferably to a base-clipping circuit 6.

The gate of the matching transistor 33 is connected through a connection C4 to a second voltage source P2 which is internal or external to the electromagnetic radiation detection device. The second voltage source P2 is adjusted so as to guarantee operation of the matching transistor 33 in saturated mode.

Figure 1:
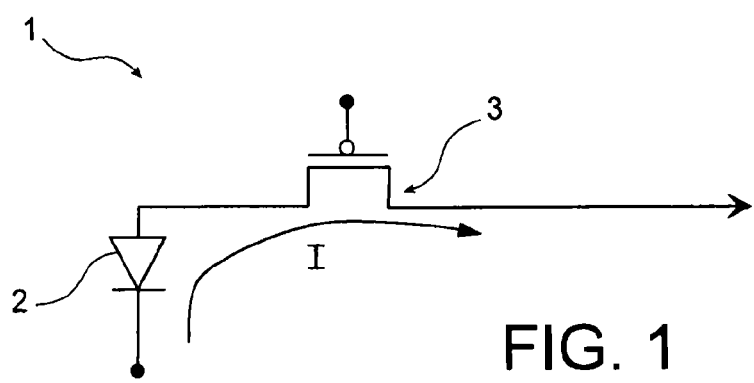
FIG. 1 (previously described) illustrates an example of a known electrical diagram of a pixel including an infrared elementary detector, in this case a photodiode, and a matching transistor in a direct injection assembly.
Figure 2:
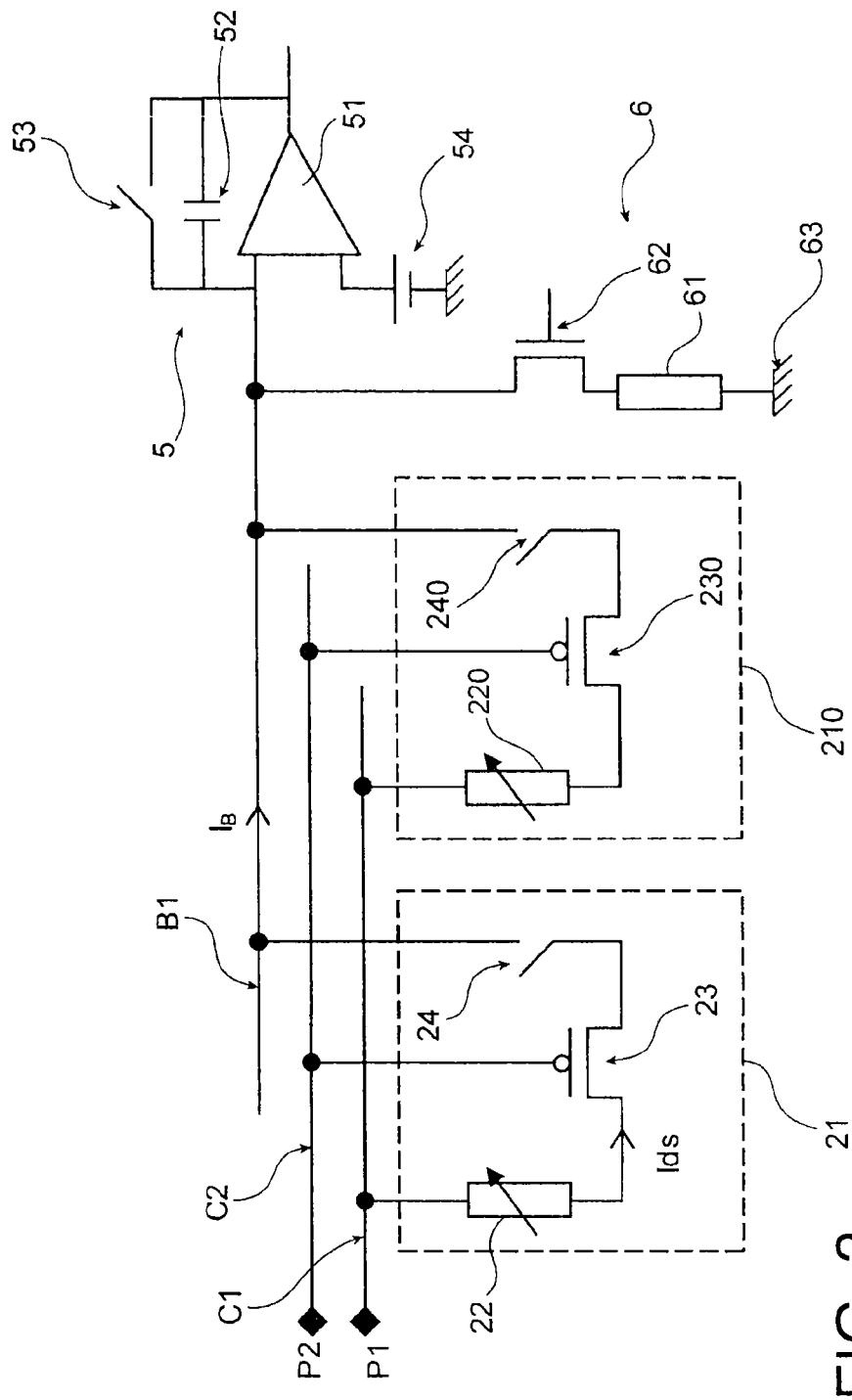
FIG. 2 (previously described) illustrates a partial electrical diagram of an electromagnetic radiation detection device using a read mode of the elementary detectors of the microbolometer type by direct injection assembly, of a known type, in which a matching transistor of the PMOS type assembled with a common gate is associated with each detector.

The capture and shaping circuits 5 and the base-clipping circuits 6 are similar to the state of the art ones. The circuit examples represented in this figure are used as illustrations and do not restrict the invention. The circuits are those described in FIG. 2; for this reason they are not described a second time. Other types of capture and shaping circuits 5 and base-clipping circuits 6 may easily be used without thereby going beyond the scope of the invention.

Depending on the assembly of FIG. 3, in a situation in which, respectively, one of the two switches 34 or 340 is closed, an electrical reading current Ids is established between the first voltage source P1 and the read bus B2, through firstly the elementary detector 32 or 320, which is thus connected, and secondly the single matching transistor 33 of the sub-assembly 300.

Means of control 350 which are examples of the known art, for example including a shift register, are designed to close successively in a sequential order the various switches 34, 340 present in a given sub-assembly 300 such that, at a given instant at most a single switch 34, 340 of a given sub-assembly is closed. This enables a current of value equal to the reading current Ids to flow over the read bus B2, with a signal representative of a temporal multiplexing of the signals delivered by the various elementary detectors 32, 320 of the sub-assembly 300.

In the sub-assembly 300 a single matching transistor 33 enables two different elementary detectors 32, 320 to be coupled. It follows that for a given interval between the two elementary detectors 32, 320, the matching transistor 33 may be of a size which may be increased by a factor two compared to the situation, which is traditional in the state of the art, comprising one matching transistor for each elementary detector. This enables the signal-to-noise ratio of the detection device according to the invention to be improved.

More particularly, the elementary detectors 32, 320, defining a first plane, can be present in a different plane of the impedance-matching device 33 and of the capture and shaping circuit 5, defining a second plane. The two planes are advantageously one above the other. The elementary detectors 32, 320 can then be close to one another, without however being contiguous. In this way, since each elementary detector 32, 320 has a given main area, it will be considered that the area of a pixel is roughly equal to the main area of an elementary detector 32, 320.

If it is in a second plane relative to the elementary detectors 32, 320, the impedance-matching device 33 can advantageously be extended face to the elementary detectors 32, 320 of the sub-assembly 300. It is thus possible to manufacture a matching transistor 33 having an area roughly equal to a combined area of all the pixels of the sub-assembly 300. In this way, the matching transistor 33 may have a gate area greater than at least the area of a pixel or the main area of an elementary detector. It is also possible to manufacture the matching transistor 33 such that the gate area is roughly equal to a sum of the main areas of several of the elementary detectors 32, 320 of the sub-assembly 300, or of all of them. It is understood that the matching transistor 33 may have, in the example of FIG. 3, a high gate area, for example greater than the area of an elementary detector 32, 320, or close to the combined area of the elementary detectors of the sub-assembly, in this case two elementary detectors.

The electrical diagram of FIG. 3 shows an axial symmetry of order two, from which advantage may be taken in order to produce an electromagnetic radiation detection device in which the two interconnections 301, 302 which connect the first terminals 32.1, 320.1 of the elementary detectors 32, 230 to the source electrode of the transistor 33 are of roughly identical lengths and sections. These interconnections 301, 302 then have roughly equal electrical resistances, provided they are manufactured from the same material. If they are not strictly equal their resistances are at least comparable. This configuration of the interconnections 301, 302 enables the production of the common node A to be optimised, notably to reduce the spatial noise of the electromagnetic radiation detection device.

It will be seen in due course that the interconnections may have different geometries, whilst also having roughly equal electrical resistance values.

Figure 5:
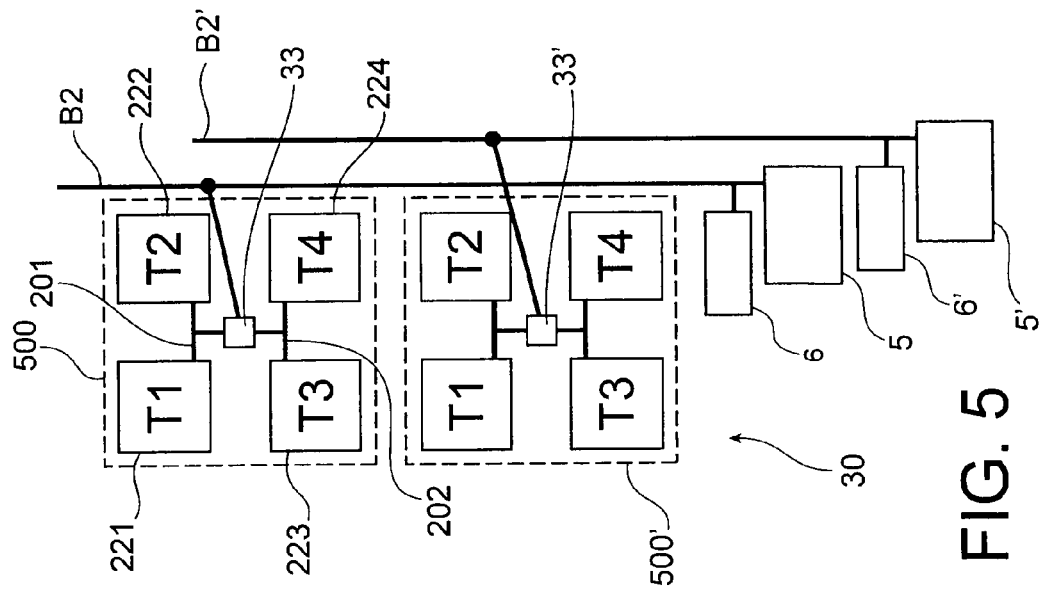
FIG. 5 is a schematic view of an electromagnetic radiation detection device according to a second embodiment of the invention.
Figure 4:
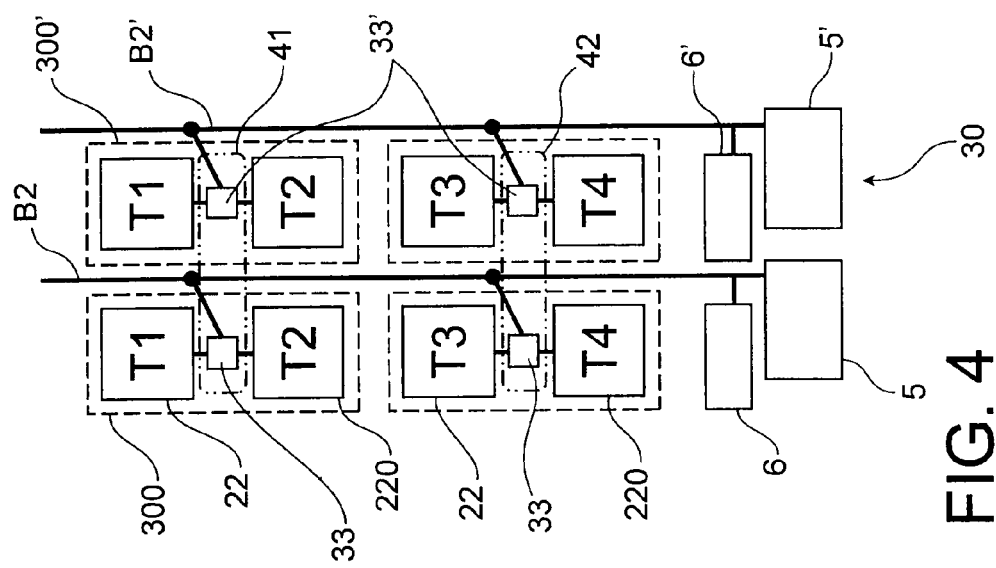
FIG. 4 is a schematic view of the electromagnetic radiation detection device in accordance with the first embodiment of the invention.

The invention will be better understood in conjunction with FIGS. 4 and 5, which illustrate a partial schematic plane view of a first embodiment and of a second embodiment of the electromagnetic radiation detection device according to the invention.

FIGS. 4 and 5 are functional diagrams of embodiments of the invention. The different elements of the diagram represent functions, and an arrangement of the different functions. The functional diagrams do not seek to give information concerning the respective sizes of the different elements of the electromagnetic radiation detection device, or to confirm or refute the fact that the elements may be positioned vertically relative to one another. Certain elements can be omitted in order to simplify a reading of the diagram. The scope of the invention is not limited by the functional diagrams of these figures.

FIG. 4 represents schematically an electromagnetic radiation detection device 30 according to the invention including multiple elementary detectors 22, 220 grouped into several sub-assemblies 300, 300' of elementary detectors 22, 220 arranged in a matrix with at least one line and one column. The sub-assemblies are represented by dotted lines. The various elementary detectors are integrated on an unrepresented substrate. In this embodiment a portion of two columns of the matrix is represented. Since each column contains at least two sub-assemblies 300, 300' of two elementary detectors, the elementary detectors 22, 220 of a sub-assembly 300, 300' belong to a given column of the matrix. Each column of elementary detectors is connected to a read bus B2, B2' able to transmit a signal originating from the elementary detectors 22, 220 of the sub-assemblies 300, 300' from the column to a circuit 5, 5' for capture and shaping of the signal delivered by the elementary detectors concerned. A base-clipping circuit 6, 6' is also connected to each read bus B2, B2'. The elementary detectors 22, 220 are positioned relative to one another with a given interval in a given line, and another interval, which may be identical to or different from the previous one, in a given column of the matrix.

Each sub-assembly 300, 300' includes elementary detectors and other electrical circuit elements; the elementary detectors and the other electrical circuit elements are preferably integrated in two separate planes positioned one above the other, according to a monolithic or hybrid architecture, as described above.

The electrical circuit elements include a single impedance-matching device, in this case taking the form of a matching transistor 33, 33', common to the elementary detectors of a given sub-assembly 300, 300', one switch, unrepresented, for each elementary detector 22, 220 and interconnections between the elementary detectors 22, 220 and the matching transistor 33, 33', as previously described in FIG. 3.

Each elementary detector 22, 220 is connected by its first terminal to the matching transistor 33, 33' which connects it to the read bus B2, B2'. To simplify the figure not all the circuit elements are represented, and in particular the switches are not shown.

To undertake a capture of the signals delivered by each of the elementary detectors of the electromagnetic radiation detection device, a sequential reading is undertaken for each column of the different elementary detectors at instants which are chronologically identified in FIG. 4 by the symbols T1, T2, T3 and T4.

At instant T1 the elementary detectors 22 of the first line, in all the columns, are simultaneously read, where a switch (unrepresented) connects them to a first voltage source (unrepresented), and where a reading current is allowed to flow in these elementary detectors 22. The elementary detectors 22 read are connected, through matching transistors 33, 33', from their sub-assembly present in a first row 41 of matching transistors 33, 33', to the different capture and shaping circuits 5, 5' located at the base of each of the columns.

At instant T2, a reading is made of a second line of elementary detectors 220, corresponding to the second elementary detectors of the previously measured sub-assemblies, still through the first row 41 of matching transistors 33, 33'.

At instant T3 a third line of elementary detectors 22 is read, but through a second row 42 of transistors 33, 33', where each of them belongs to sub-assemblies 300, 300' other than those the elementary detectors of which were previously read. This second row 42 of matching transistors 33, 33' will also be used at instant T4 for a reading of a fourth line of elementary detectors.

This sequential reading, called multiplexing, of the different lines of elementary detectors is made possible through appropriate control of the switches connecting the elementary detectors 22, 220 to the first voltage source delivering the reading current required to read the elementary detectors. This process can, of course, be designed for any number of lines and for any number of columns.

According to this embodiment a given matching transistor 33, 33' is used at two different instants to recover a delivered signal originating from two separate elementary detectors 22, 220 since a matching transistor is common to two elementary detectors of the same sub-assembly. Geometrically, this matching transistor 33 is within the footprint of the two adjacent elementary detectors 22, 220 of a given sub-assembly 300 and the area of the gate of the matching transistor 33 can then be enlarged proportionately relative to the case in which there were as many matching transistors as elementary detectors, as described above in relation to FIG. 2.

The source electrode of the matching transistor in a sub-assembly may advantageously be located equidistantly from the first terminals of the two elementary detectors 22, 220. This location may be exploited to accomplish, within each sub-assembly 300, 300', an assembly in which the two interconnections which connect the elementary detectors 300, 300' to the source electrode of the matching transistor 33, 33' are ideally identical in respect of their geometry, defined by their lengths and their transverse sections, i.e. the product of their widths multiplied by their thicknesses, and at least comparable with regard to their resistances.

Advantageously, the matching transistor 33, 33' is located in a second plane different from a first plane defined by the elementary detectors 22, 220, as illustrated below in FIG. 9. The two planes are advantageously positioned vertically relative to one another. Thus, as explained in relation with FIG. 3, the area of a pixel may be close to the main area of an elementary detector 22, 220 and it is possible to obtain matching transistors the gate area of which may attain a value close to a sum of the main areas of the two elementary detectors 22, 220 of the sub-assembly.

If the matching transistors 33, 33' are in the same plane as the elementary detectors 22, 220, here again it is also possible to have matching transistors 33, 33' which are twice as large as in the case in which the matching transistor 33, 33' is connected only to a single elementary detector.

It is possible, in various embodiments of the invention, if the elementary detectors in each sub-assembly 300, 300' belong to several columns of the matrix, to have the same read bus connected to elementary detectors belonging to several columns of the matrix, or several read buses for elementary detectors belonging to the same column of the matrix and/or the multiplexing may take place within a given line of elementary detectors.

FIG. 5 is a partial schematic plane view of a second embodiment of the electromagnetic radiation detection device, in accordance with the invention and illustrating the possibility explained above.

The various elementary detectors of the electromagnetic radiation detection device 30 are in this case grouped into sub-assemblies 500, 500', where each includes four elementary detectors 221, 222, 223, 224, aligned in two lines of two elementary detectors. In each of the sub-assemblies 500, 500', the elementary detectors 221, 222, 223, 224, are each connected by means of interconnections 201, 202 to the single impedance-matching device taking the form of a matching transistor 33, 33'. The interconnections 201, 202 are in this case represented in a T shape and connect two elementary detectors 221, 222 or 223, 224 together with the matching transistor 33, 33'. The matching transistor 33, 33' is connected, through a read bus B2, B2' to circuit 5, 5' for capture and shaping of the signal delivered by each of the elementary detectors and to a base-clipping circuit 6, 6'. The matching transistors 33, 33' are assembled using direct injection and are able to provide an impedance matching between the elementary detectors 221, 222, 223, 224 of the sub-assemblies 500, 500' and the capture and shaping circuit 5, 5'.

In this case the two sub-assemblies 500, 500' represented form a row of sub-assemblies. In addition, each sub-assembly includes elementary detectors belonging to two columns of the matrix. The sub-assemblies are connected in alternate fashion, in a given row of sub-assemblies, to one read bus from among two read buses B2, B2' and to one capture and shaping circuit 5, 5' from among two capture and shaping circuits 5, 5'. Thus, each read bus B2, B2' receives a signal delivered by elementary detectors located in two columns of the matrix, and neither of the two read buses B2, B2' represented is connected to all the elementary detectors of one of the columns of the matrix. This configuration enables there to be, on average, one read bus B2, B2' for a number of detectors comparable to a number of elementary detectors contained in a single column.

Advantageously, each of the capture and shaping circuits 5, 5' and each of the read buses B2, B2' are common to several sub-assemblies 500, 500', even if only two sub-assemblies 500, 500' are represented.

Since the said sub-assemblies 500, 500' are arranged in the form of rows, this allows a sequential reading of the elementary detectors 221, 222, 223, 224 in a chronological order identified by the symbols T1, T2, T3 and T4 in FIG. 5.

At instant T1 the elementary detectors 221 of the two sub-assemblies represented are simultaneously connected to a capture and shaping circuit 5, 5' through the matching transistor 33, 33' associated with the sub-assembly concerned. Each of the two read buses B2, B2' therefore receives a signal delivered by an elementary detector located in the same position relative to each sub-assembly.

At instants T2, and subsequently T3, and subsequently T4, a single elementary detector 222, 223, 224 of each sub-assembly 500, 500', and never the same one, is connected in succession to the capture and shaping circuit 5, 5'. At each of these instants T1, T2, T3, T4, no reading current flows between the other elementary detectors 221, 222, 223, 224 and the matching transistor 33, 33'.

It is understood that if there are several sub-assemblies 500, 500' connected to a read bus B2, B2', the sequential reading must take into account the elementary detectors which they contain such that at a given instant T only the signal delivered by a single elementary detector flows in the read bus B2.

It should be noted here that other temporal sequences are possible without however going beyond the scope of the invention.

In particular, the different sub-assemblies 500, 500' arranged in a given row of sub-assemblies can be connected to the same read bus B2, B2', allowing an economy of read buses B2, B2' at the scale of the matrix, at the cost of a longer multiplexing time than in the first embodiment, since all the elementary detectors located in two columns of the matrix must be multiplexed over the same read bus.

According to this second embodiment, a given matching transistor 33, 33' is used at four different instants T1, T2, T3, T4, for the reading of four separate elementary detectors 221, 222, 223, 224 of a given sub-assembly 500, 500'. This matching transistor 33, 33' is geometrically within the footprint of the four elementary detectors of the sub-assembly. Thus, the gate area of the matching transistor may be adjusted proportionately in the manner mentioned in relation with FIGS. 3 and 4. Since it is connected to a sub-assembly including other elementary detectors distributed into two lines and two columns, the positioning of the source electrode of the matching transistor benefits advantageously from an axial symmetry of order 4. The source electrode may, for example, be designed such that it is positioned equidistantly from the first terminals of each of the four elementary detectors. It may, for example, take the shape of a U, always having at least one point at a fixed distance from the first terminal of each elementary detector. This measure enables roughly identical coupling characteristics to be obtained for all the elementary detectors of the sub-assembly and therefore for all the elementary detectors of the matrix. Notably, interconnections 201, 202 have a roughly equal resistance value, and thus induce a low parasitic resistance, and form a small spatial noise component element.

Other embodiments which take advantage of layout symmetries of the elementary detectors according to the embodiments of the invention may be conceived to design the matching transistors according to the invention.

Figure 6A:
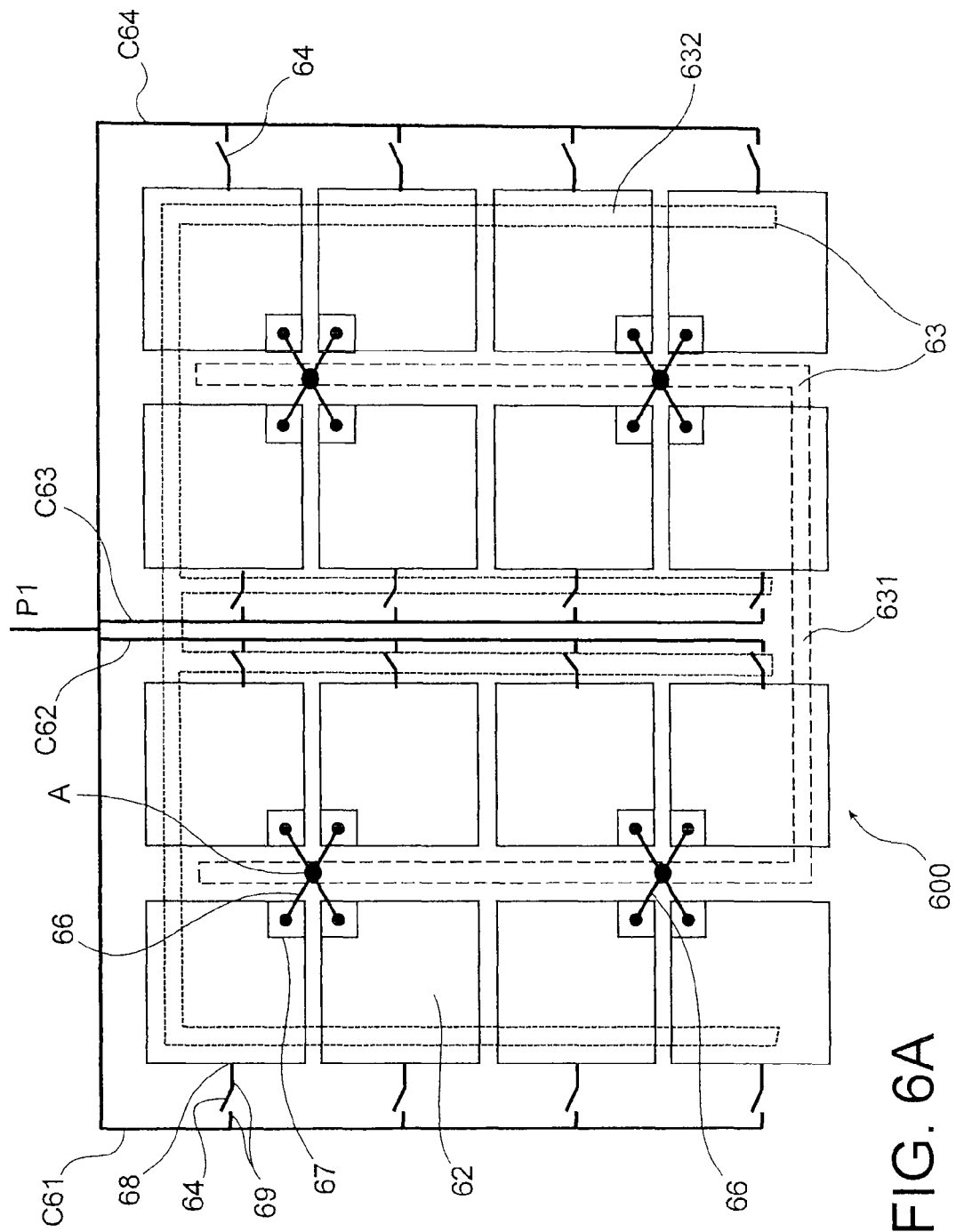

As an example, FIGS. 6A and 6B are representations of a third embodiment of an electromagnetic radiation detection device in accordance with the invention, designed for a sub-assembly 600 of sixteen elementary detectors 62. FIG. 6A illustrates the positioning of the sixteen elementary detectors 62 each having a first terminal 67 to connect them to the impedance-matching device 63, positioned between them with an axial symmetry of order four in the form of four columns of four elementary detectors 62, integrated in a first plane. Sub-assembly 600 therefore includes elementary detectors 62 originating from four columns and from four lines of the matrix, where each column of the sub-assembly belongs to a column of the matrix. The elementary detectors 62 are connected by a second terminal 68 to a first voltage source P1 by means of connections C61 to C64, one connection for each column of the sub-assembly 600. Each connection C61 to C64 is connected to four elementary detectors 62 by means of electrical connections 69, each including a switch 64. Each switch 64 is positioned such that it is able to connect to a connection C61, C62, C63 or C64 only a single elementary detector 62.

In accordance with the possibilities offered by the previously described monolithic or hybrid structures, a matching transistor 63 common to the sixteen elementary detectors 62 is located in a second plane, different from a first plane defined by the elementary detectors 62. The two planes are advantageously positioned vertically relative to one another. Connections C61 to C64 and/or the electrical connections 69 and the switches 64 can also be located in the second plane, or in a third plane. The second plane, including non-exclusively a matching transistor 63, will be described in greater detail below, in relation with FIG. 6B. The juxtaposition of the different planes will be explained in greater detail in the description of FIG. 9 above.

The matching transistor 63 is partially represented in FIG. 6A by its source electrode 631 defined using large dots, and by its drain electrode 632 which is shown using small dots. In the example of FIG. 6 the source electrode 631 and drain electrode 632 are interdigitated. The gate of the transistor is not represented to simplify the figure, but it extends, as might be expected, between the source and the drain of the matching transistor 63, which are unrepresented. It is then divided up into several gate parts pointing in the directions of the columns of elementary detectors 62 of the sub-assembly 600. In the particular case of this embodiment, the source electrode 631 has the shape of a "U", with a branch of the U extending between the first two columns of elementary detectors, on the left in FIG. 6A, and the other branch of the U extending between the other two columns of elementary detectors, on the right in FIG. 6A.

The drain electrode 632 is formed such that it interdigitates with the source electrode 631. In this case it has the shape of a comb including several branches, in which each branch of the source electrode 631 is located between two neighbouring branches of the drain electrode 632. In this case, since the source electrode 631 has a U shape, the drain electrode has the form of a comb with four branches. Alternatively, it may be a comb with three branches if the second and third branches represented here are grouped together to form only a single branch. The first terminals 67 of the different elementary detectors 62 are each connected to the source electrode 631 of the matching transistor 63 by an interconnection 66.

In the example of FIG. 6A, the first terminals 67 are connected electrically four-by-four in a node A; where node A is located at a point in the source electrode 631. There are therefore four A nodes connecting elementary detectors 62 to the source electrode 631.

The matching transistor is described in greater detail by observing FIG. 6B. Gate 633 is formed here from four parts each located between, respectively, a branch of the source electrode 631 and a branch of the drain electrode 632. The parts of the gate 633 are wide compared to the source 631 and drain 632 electrodes; they occupy almost all the space between a branch of the source electrode 631 and a branch of the drain electrode 632.

Thus, the parts of the gate 633 assume the shape of rectangles aligned roughly with a column of elementary detectors 62 of the sub-assembly. The different parts of the gate 633 are connected to one another by electrical connections C65 to form a single gate 633 connected to a second voltage source P2, enabling the matching transistor 63 to be operated in saturated mode.

The drain electrode 632 is connected by an electrical connection to a read bus B2.

In FIG. 6B a possible positioning 62' is observed, using dotted lines, of several of the sixteen elementary detectors of the sub-assembly 600 presented in FIG. 6A, located in the first plane, different from the second plane containing the matching transistor 63.

It is possible, if two branches of the drain electrode 632 are close and not separated by a branch of the source electrode 631, to manufacture the matching transistor such that both these branches of the drain electrode are merged into a single branch.

This embodiment enables a matching transistor 63 of substantial size to be manufactured which may be within the footprint of sixteen elementary detectors 62, with a gate area which can be greater than the main area of a detector, or greater than the main areas of two, three, five, ten or fifteen elementary detectors or more, combined.

A construction according to this embodiment can be extended to a sub-assembly containing more than sixteen elementary detectors. There may, for example, be thirty-six elementary detectors, arranged in six lines and six columns, connected four-by-four to the source electrode. The source electrode then has the shape of a "W", a comb with three branches.

It is possible to have twenty-four elementary detectors in the sub-assembly, forming either four lines of six columns, or four columns of six lines. In this way the source electrode can have respectively the shape of a U or of a W.

As in each embodiment of the invention in which elementary detectors are, in a first plane, different from a second plane including the matching transistor, the gate area of the matching transistor may be greater than or equal to that of 60% or 75% or 80% or even 90% of a sub-assembly area, defined as being a sum of the main areas of all the elementary detectors of the sub-assembly.

Figure 9:
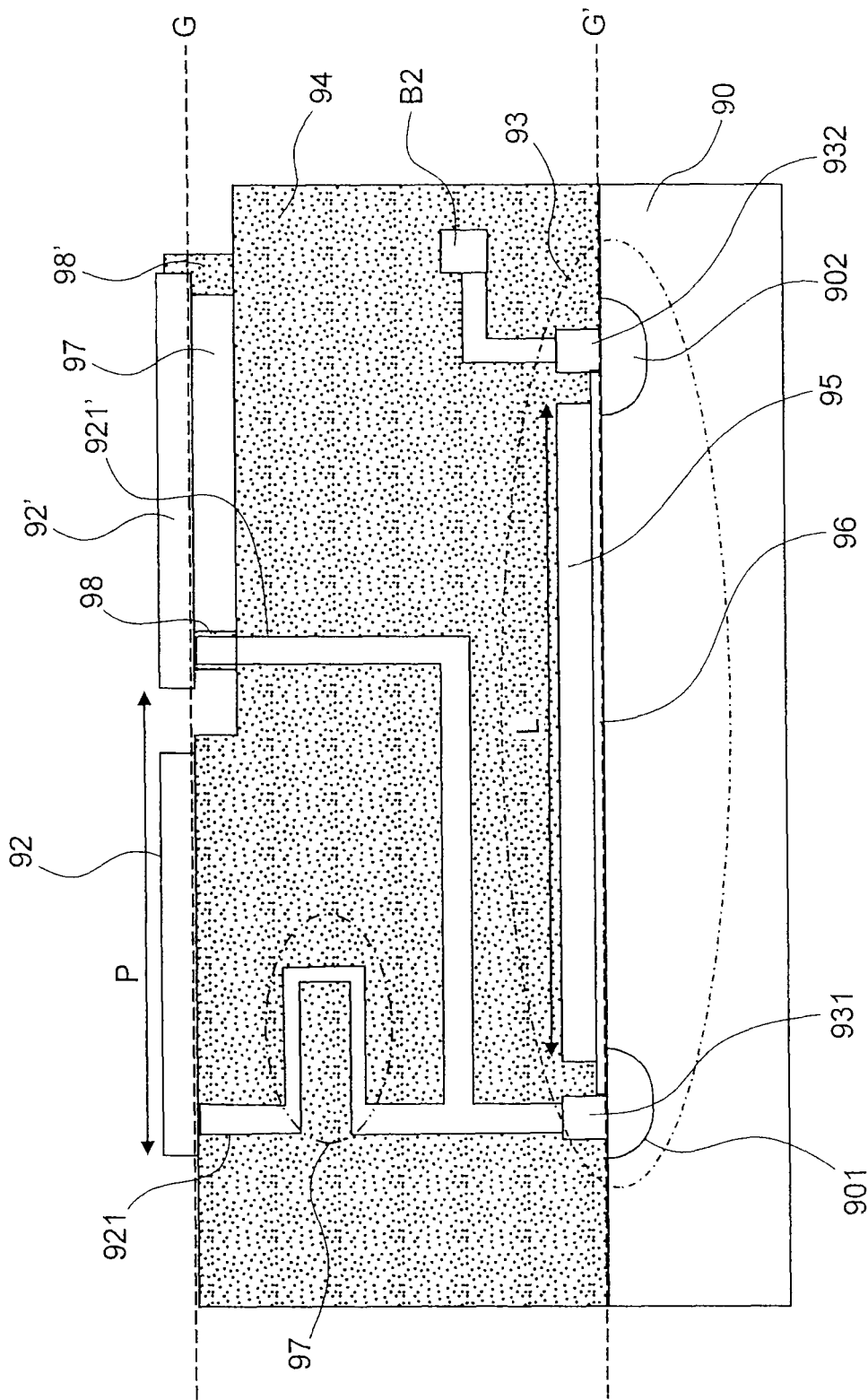
FIG. 9 illustrates a section view of an electromagnetic radiation detection device according to the invention including two elementary detectors in a sub-assembly, connected to a given matching transistor.

The remainder of the area of the sub-assembly, in the second plane, as is illustrated below in FIG. 9, is required in order to:
- form the source and drain electrodes,
- form a source and drain under these said electrodes,
- convey the read bus, form electrical connections powering the gate, switches, control connections to organise a read multiplexing by means of switches, and all other electrical or electronic elements required for the operation of a detector, and in particular of a photodiode or microbolometer.

One of the advantages of manufacturing the matching transistor with a source electrode forming a comb the branches of which are spaced out in two columns of elementary detectors is that it is possible to form very short interconnections all of which have the same geometry. As a result, the interconnections all have a roughly identical electrical resistance value.

The invention preferably includes interconnections, connecting each elementary detector to the impedance-matching device, having roughly equal dimensions so as to have roughly equal resistances.

In addition to the resistance due to an electromagnetic radiation, each capture and shaping circuit receives a residual impedance including firstly the resistance of the interconnections and secondly a localised impedance between the impedance-matching device and the capture and shaping circuit. This impedance is reduced by the impedance-matching device. Thus, throughout the entire matrix, the residual impedances are roughly identical and there is an overall reduction of parasitic resistances.

However, it is possible to obtain equality of the resistance value of the interconnections by giving the interconnections different dimensions relative to one another. In particular, it is possible to obtain roughly equal resistances for elementary detectors located at different distances from the same impedance-matching device.

To accomplish this, the present invention proposes artificially to increase the resistance of at least one interconnection originating from an elementary detector close to the impedance-matching device, relative to the resistance of an interconnection derived from another elementary detector further from the impedance-matching device, such that the resistances of the two interconnections are roughly equal. The reverse is possible by reducing the resistance of the interconnection originating from a more distant elementary detector.

Figure 7:
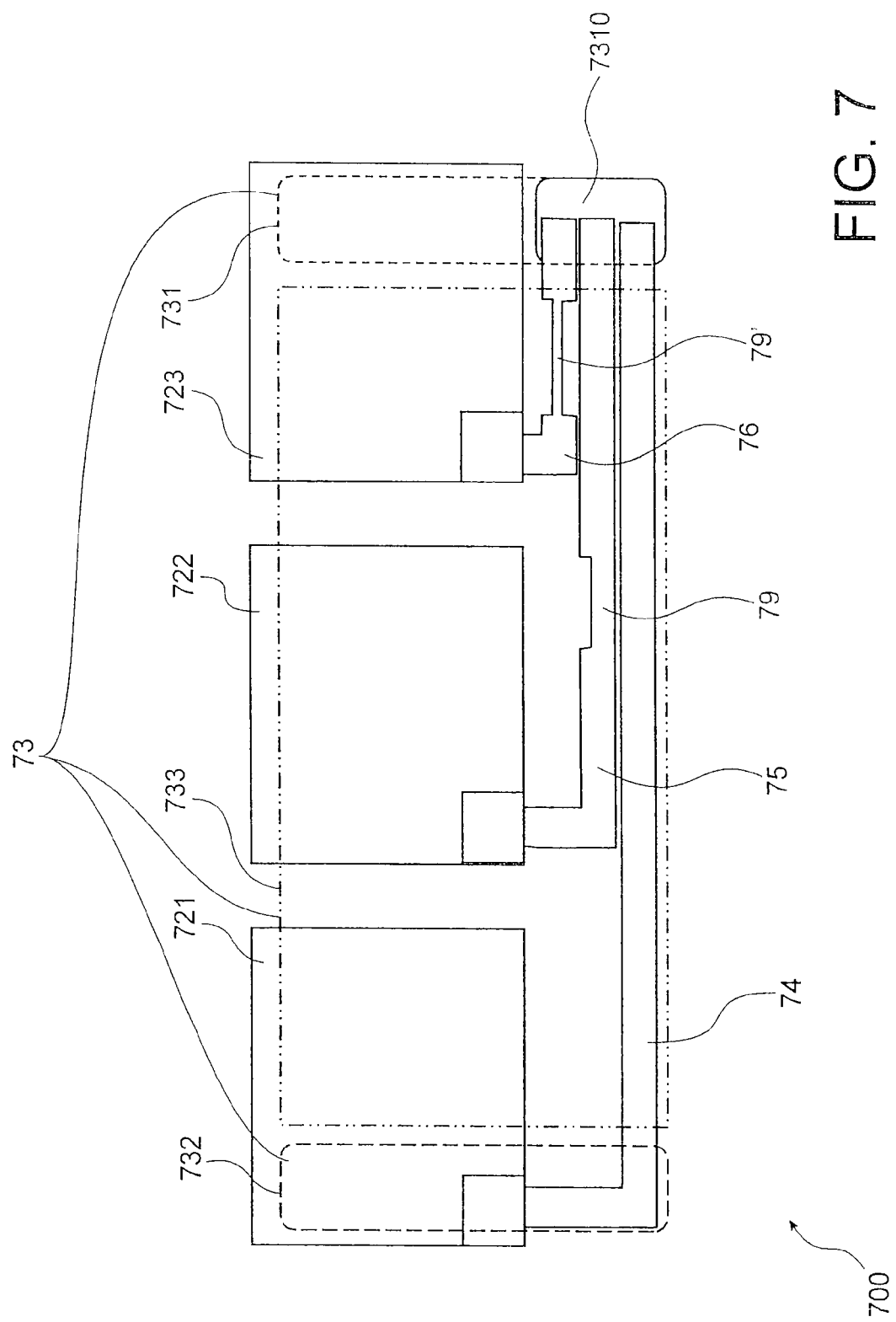
FIG. 7 is a schematic view of an electromagnetic radiation detection device according to the invention, in which some of the interconnections have increased resistances by partial narrowing of their widths.

FIG. 7 illustrates a particular example of this embodiment of the invention, in particular when no particular symmetry in the arrangement between the elementary detectors of a sub-assembly is formed.

A sub-assembly 700 includes a first, a second and third elementary detector, respectively noted, from left to right, 721, 722 and 723 and positioned in the first plane, organised into a line. In a second plane, different from the first plane, a matching transistor 73 is formed which is common to the three elementary detectors. The two planes are positioned one above another, where the elementary detectors 721, 722, 723 are in face to at least a part of the matching transistor 73. The matching transistor 73 includes a source located in the area of the third elementary detector 723, a drain 732 located in the area of the first elementary detector 721 and a gate 733 inserted between the source 731 and the drain 732. The gate 733 is present under at least the second elementary detector 722 and under a part of the first and third elementary detectors 721 and 723. The source electrode 7310 is located in the area of the third elementary detector 723. The third elementary detector 723 is closer to the source electrode 7310 than the second elementary detector 722, which is itself closer than the first elementary detector 721.

The elementary detectors 721, 722, 723, are connected respectively to the source electrode 7310 by means of interconnections 74, 75, 76.

In such a way as to compensate for the variations of resistance between these interconnections due to the differences of distance between the elementary detectors 721, 722, 723 and the source electrode 7310, the example of FIG. 7 proposes artificially to increase the resistances of the two interconnections 75, 76 originating from the elementary detectors 722, 723 closest to the source electrode 7310, in order to make them roughly equal to the resistance of the interconnection 74 originating from the elementary detector 721 furthest from the source electrode 7310.

A shortest possible path is defined to connect an elementary detector to a source electrode taking into account the relative positions and the encumbrances of the other elementary detectors, the other interconnections and the source electrode. It is therefore possible to define a shortest possible length to connect an elementary detector to the source electrode.

One means of increasing the resistance of an interconnection is to lengthen the interconnection length beyond the shortest possible length.

This solution, which is of interest, may, however, congest the detection device with interconnection lengths serving no purpose.

The interconnections are normally made with an interconnection section which is roughly equal for all the interconnections of the electromagnetic radiation detection device. From this point forth we shall refer to such a section, which is common to most of the interconnections, or at least to a part of most of the interconnections, by the term "nominal section". In addition, the interconnections are defined as having a given length.

The invention proposes to introduce a narrowing of the section of an interconnection of which it is desired to increase the resistance, over at least a part of its length, or over its entire length. Such a narrowing of the section leads to a greater resistance. By adapting the length of the part having a smaller section it is possible to modify the resistance increase value. Such a reduction of section 79, 79' is represented in the interconnections 75, 76 connecting the second and third elementary detectors 722, 723 to the source electrode 7310.

It is also possible to combine both methods, for example by increasing the length of an interconnection to more than the shortest possible length, and in addition by reducing its section over a given length.

If, on the contrary, the aim is to reduce the resistance of interconnections originating from elementary detectors further away than other elementary detectors it is possible to widen the section of these interconnections, at least over a part of their length, or over their entire length.

Thus, it is possible to widen the sections of certain interconnections of which it is desired to reduce the resistance, and to reduce the section and/or increase the length of certain interconnections of which it is desired to increase the resistance value.

Such a method enables sub-assemblies to be formed in which the resistance value is roughly equal for all the interconnections, without requiring any symmetry in the arrangement of the elementary detectors. There may, for example, be an uneven number of elementary detectors. There is thus no need to seek to form the source electrode at an equal distance from the various elementary detectors. This allows the manufacture and design of the matching transistors to be simplified. In addition, it is possible to design matching transistors having an optimum dimension, and to define sub-assemblies of elementary detectors at a later stage, for example by choosing elementary detectors facing the matching transistor.

It is preferable to form sub-assemblies including symmetrical arrangements of elementary detectors so as to reduce the lengths of the interconnections, and to enable interconnections of roughly equal resistance to be obtained more easily. However, the skilled man in the art will be able to make a compromise between facilitating the attainment of roughly equal resistances and facilitating the design of the impedance-matching transistors.

Figure 8:
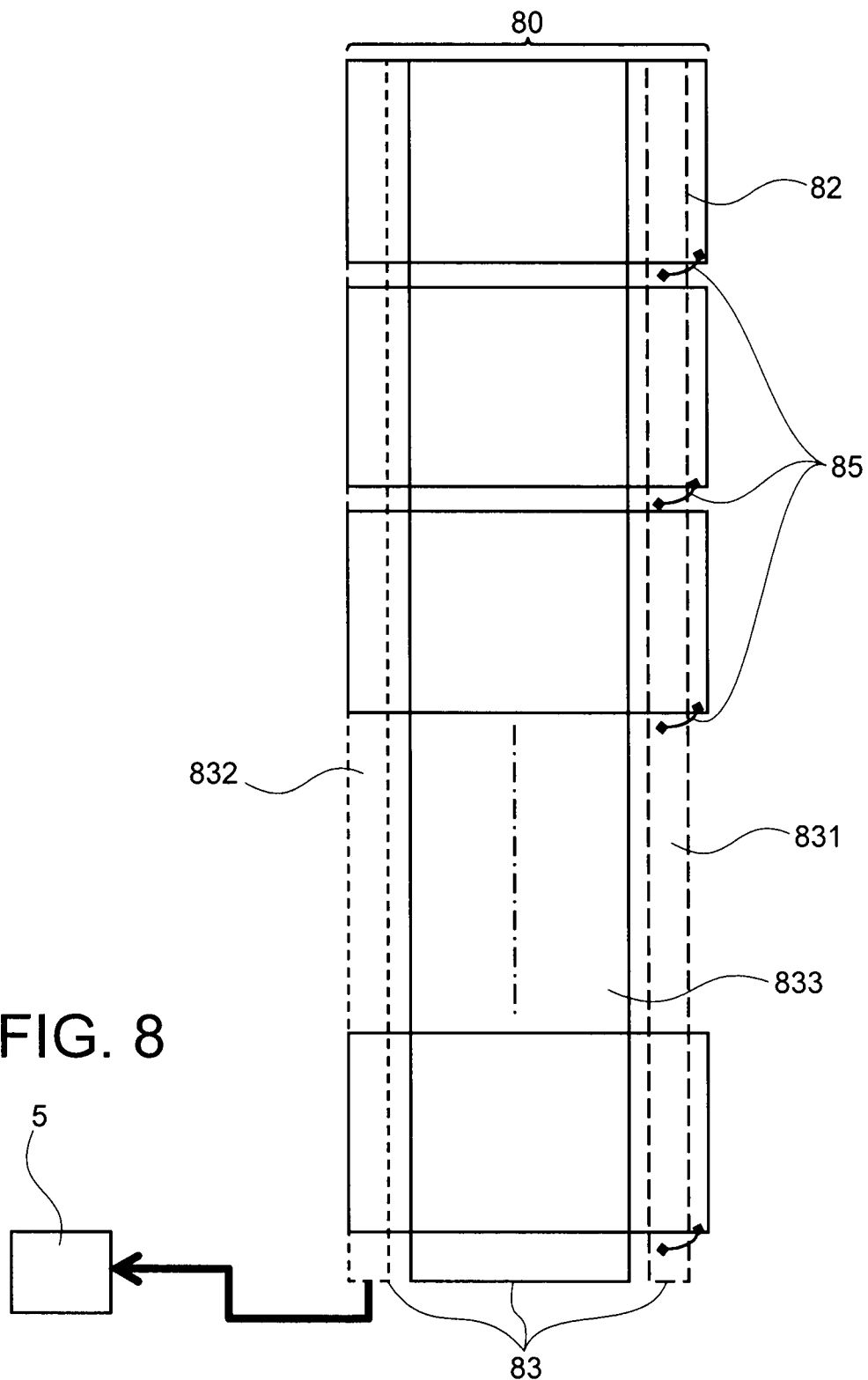
FIG. 8 illustrates a diagram of an electromagnetic radiation detection device according to the invention, one sub-assembly of which contains all the elementary detectors of a column of elementary detectors.

FIG. 8 illustrates another manner of applying the invention. This embodiment presupposes that the elementary detectors 82 of a given column 80 of the matrix belong to a given sub-assembly of elementary detectors and are in the same plane, called the first plane. In a second plane, different from the first plane, an impedance-matching transistor 83 common to all the elementary detectors 82 is formed.

The matching transistor 83 includes a source electrode 831 positioned along column 80, over the entire length of column 80 of elementary detectors, to the right in FIG. 8. The source electrode is located roughly on one side of the elementary detectors 82 of column 80 of detectors, and in a different plane.

The matching transistor 83 includes a drain electrode 832 positioned along the column 80 over the entire length of column 80 of elementary detectors facing the source electrode 831 on the other side of the elementary detectors, to the left in FIG. 8, in a plane different from the elementary detectors. A gate 833 extends roughly between the source electrode 831 and the drain electrode 832. The gate 833 is therefore located on or under the elementary detectors 82 aligned with the direction of an observer with regard to the studied device, in a different plane. The source electrode 831, the drain electrode 832 and the gate 833 are then not in direct electrical contact with the elementary detectors 82.

The source electrode 831 is, however, electrically connected to the elementary detectors 82 by means of interconnections 85. In the example of FIG. 8, at least one part of the source electrode 831 is facing at least one part of each elementary detector 82. As a consequence, the elementary detectors are connected to the source electrode 831 by a shorter path. For example, for two elementary detectors 82 in proximity, interconnection 85 originating from one of the elementary detectors 82 passes between the two elementary detectors. According to another example, there may be vertical interconnections extending vertically between a plane where the source electrode 831 is located and the first plane containing the elementary detectors 82.

The drain electrode 832 is connected to a capture and shaping circuit 5.

According to this embodiment the interconnections 85 have roughly equal resistances. In addition, the matching transistor 83, which is common to all the elementary detectors 82 of the column 80, has dimensions such that its transconductance is as high as possible.

Such an embodiment may be modified such that the sub-assembly is formed from a fraction of a column of the matrix, i.e. that the sub-assembly consists of elementary detectors forming a fraction of a column of the matrix. There may therefore be several sub-assemblies in one column. Another modification of this embodiment is possible by forming the sub-assembly such that it consists of two or more columns. A matching transistor is then common to elementary detectors located in two columns or more of the matrices.

The sub-assembly may be formed of fractions of columns originating from two or more columns, forming a group of columns. In these cases, the source electrode is advantageously located along the length of the elementary detectors of a column located at one end of the group of columns, and the drain electrode is located along the length of the elementary detectors of a column located at another end of the group of columns. In addition, the interconnections have roughly equal resistances for all the elementary detectors. In this way, certain interconnections must have an increased resistance relative to the resistance which they would have had if they connected elementary detectors to the source electrode by the shortest possible path.

FIG. 9 illustrates a section of an embodiment of a detection device according to the invention showing two elementary detectors 92, 92' of a given sub-assembly present in a first plane G and a matching transistor 93 present in a second plane G'. The first plane G and the second plane G' are positioned one above the other, and the matching transistor 93 is facing the two elementary detectors 92, 92'.

The elementary detectors 92, 92' can be positioned in the area of a layer of dielectric material 94, called the dielectric layer, which is itself present on a substrate 90. The second plane G' is defined by an interface between the dielectric 94 and the substrate 90.

In the dielectric layer 94 the following are present:
source electrode 931 and drain electrode 932,
a read bus B2 connected to the drain electrode 932,
interconnections 921 and 921' connecting the elementary detectors 92, 92' to the source electrode 931,
a gate electrode 95.

Neither switches nor electrical connections connecting the elementary detectors to the switches are represented, for the sake of simplifying the figure.

The interconnections 921, 921', the electrical connections and the read bus B2 can be considered either as being in the second plane G' in the sense that are included between the elementary detectors 92, 92' and the substrate 90, or as being in other planes, inserted between the first and second planes, or as being in other planes inserted between the first and second planes G, G'.

As a variant, certain elementary detectors 92', or all, may be separated from the dielectric layer 94 by an air space 97. The air space may possibly under low barometric pressure. It may be specific to each elementary detector 92' concerned or common to several of them. These elementary detectors 92' separated from the dielectric layer 94 by an air space are preferably connected mechanically to the dielectric layer 94 by one or more supports 98, 98'. The supports may advantageously be pillars. These are preferably located at the edge of the elementary detector 92' and are used to hold the said elementary detector 92' in a fixed position relative to the dielectric layer 94. Some of these pillars may be formed by a part of the interconnection 921' connecting the said elementary detector to the source electrode 931 of the matching transistor, or contain a part of the interconnection 921'.

The substrate 90 includes a source 901 and a drain 902 connected respectively to the source electrode 931 and to the drain electrode 932.

The source 901 and the drain 902 are advantageously positioned so as to be located at two opposite ends of a sub-assembly defined by the two elementary detectors 92, 92', respectively to the left and to the right in FIG. 9.

The gate 95 extends between the source and the drain, in the dielectric layer 94, isolated from the substrate 90 by an oxide layer of gate 96. The gate is of length L greater than a single interval P repeated between the elementary detectors 92, 92'.

One of the two elementary detectors 92 is closer to the source electrode 931 than is the other of the two elementary detectors 92'. An interconnection portion 97 enabling the resistance of the interconnection 921 connecting to the source electrode 931 the elementary detector 92 closest to the source electrode 931 is then represented.

In the various embodiments of the invention, as has previously been presented in connection with FIG. 3, it is possible to pool in each sub-assembly, not just a single impedance-matching device, but also a capture and shaping circuit. This situation is suitable principally for electromagnetic radiation detection devices in visible wavelengths, including elementary detectors of the photodiode type.

The invention enables the gate area of the matching transistor to be increased proportionally to the number of elementary detectors present in the same sub-group, without introducing any parasitic resistances, which create a different spatial noise for each elementary detector in the subgroup. The consequence thereof is, firstly, in accordance with relation {3} described above, that the noise due to the matching transistor is reduced, and that the signal-to-noise ratio of the electromagnetic radiation detection device is increased accordingly compared to a device according to the referenced patent [3].

A second advantage, again in reference to the relation {3}, is that it is possible to increase the reading current in each elementary detector, compared to the state of the art, by the same ratio as the increase of the gate area permitted by the invention, without introducing any additional noise deriving from the matching transistor.

It follows, notably when the elementary detector is of the bolometer or microbolometer type, that it is possible to have a perceptible variation of the resistance of the microbolometer in amplified fashion, in proportion to the increase of the reading current. The signal delivered by the elementary detectors can therefore undergo an amplification. Here too, this enables the signal-to-noise ratio of the electromagnetic radiation detection device according to the invention to be improved.

This advantage is particularly appreciated with elementary detectors with a small main area, with an interval of less than 25 μm, which are penalised by a small incident electromagnetic radiation capture area, and which therefore require all possible amplification of the delivered signal.

Another advantage provided by the use of a greater area to design the matching transistor is that it is possible independently to adjust the length L and the width W of the gate of the matching transistor. By this means it is thus possible to obtain a greater transconductance of the matching transistor and, consequently, a greater injection efficiency defined by the relation {1}.

This effect occurs in addition to the benefit already provided by the increase of the reading current, which also contributes to the increase of the transconductance, and these two effects combine to obtain an improved restoration of the delivered signal, and therefore an improved signal-to-noise ratio of the electromagnetic radiation detection device.

The increased transconductance provided by the invention can also be used to accomplish a directly injected coupling of elementary detectors which have a low dynamic impedance. This may concern, for example, bolometers or microbolometers of low electrical resistance. The latter are required in particular when it is desired to use a transistor technology powered by low voltage, as is the case, for example, with those CMOS technologies most advanced in terms of photolithographic resolution. By increasing the reading current and the signal-to-noise ratio it is possible to use elementary detectors which have a lesser intrinsic influence on the resistance, and which could otherwise be masked by the noise.

The use of transistors having a greater gate area also offers more uniform characteristics, notably more uniform threshold voltages at the scale of the electromagnetic radiation detection device, which reduces the fixed spatial noise generated in the pixels of the matrix. It is, indeed, known that below a gate length L of around 2 μm, dispersions of threshold voltages introduce a significant increase of the fixed spatial noise due to the matching transistor. Indeed, in order to obtain a given polarisation, it is then necessary to increase the width W of the matching transistor, but this also requires that the length L of the matching transistor is increased. This is difficult in the state of the art, but it is made possible through the use of the invention.

The invention also teaches that it is possible to form a directly injected matching transistor having a large gate area, common to several elementary detectors, whilst benefiting from a uniform electrical coupling for all the elementary detectors of the electromagnetic radiation detection device. This character of uniformity concerns very particularly the resistance of the interconnections located between the elementary detectors and the source electrode of each matching transistor. This resistance is known to be particularly critical with regard to the fixed spatial noise which affects each pixel of the electromagnetic radiation detection device differently.

The invention also provides a solution to produce an image sensor, or an imager, which has both a reduced temporal noise through use of matching transistors having a large gate area, and a reduced spatial noise in the pixels through a joint use of matching transistors having a large gate area, and of a uniform coupling by means of resistance of roughly equal interconnections.

Another advantage of the invention, compared to certain embodiments of the state of the art, is that it is possible to have impedance-matching transistors having a large gate area, common to a sub-assembly of elementary detectors which are located in close proximity to one another within the matrix, and which can belong to different columns and lines of the matrix. This arrangement avoids characterising the different columns or the different lines of the matrix, and prevents the appearance of a spatial noise with a columnar or linear component element, which is particularly detrimental for the quality and for the exploitation of all images produced by the electromagnetic radiation detection device. It is, indeed, possible to form sub-assemblies of elementary detectors such that the signal capture and shaping circuits are not connected to all the elementary detectors of a given column.

REFERENCES CITED

[1] "Infrared readout electronics: a historical perspective", M. J. Hewitt, J. L. Vampola, S. H. Black, C. J. Nielsen, Proc. of SPIE Vol. 2226 Infrared Readout Electronics II, pages 108-119 (1994).

[2] "LETI/LIR" amorphous silicon uncooled microbolometer development", J. L. Tissot, F. Rothan, C. Vedel, M. Vilain, J J. Yon, Proc. of SPIE Vol. 3379 Infrared Detectors and Focal Plane Arrays V, pages 139-144 (1998).

[3] U.S. Pat. No. 6,028,309.

The invention claimed is:

1. An electromagnetic radiation detection device including multiple elementary detectors grouped into sub-assemblies, each sub-assembly including several elementary detectors and one impedance-matching device, where in each sub-assembly, each elementary detector is connected by an interconnection to the impedance-matching device, and where, in each sub-assembly, all the interconnections are identical resistance value.

2. A device according to claim 1, in which the elementary detectors are bolometers or microbolometers, photodiodes or photoconductors.

3. A device according to claim 1, in which, the elementary detectors are photodiodes and the impedance-matching device is connected to a capture and shaping circuit common to all the elementary detectors of a single sub-assembly.

4. A device according to claim 1, in which the impedance-matching device is connected to a capture and shaping circuit common to several sub-assemblies.

5. A device according to claim 1, in which each elementary detector is in series with a switch which is specific to it, and where the switches of a given sub-assembly take a closed position sequentially, such that a read bus connected to the impedance-matching device receives a signal originating from a single elementary detector at once.

6. A device according to claim 1, in which the impedance-matching device is a directly injected transistor operating in saturation, called a matching transistor, where the elementary detectors are connected to a source electrode of the matching transistor.

7. A device according to claim 1, in which the elementary detectors define a first plane, different from a second plane including the impedance-matching device, where the two planes are positioned one above the other, and where the impedance-matching device is facing at least some of the elementary detectors.

8. A device according to claim 6, in which the matching transistor has a gate area greater than a main area of an elementary detector of the sub-assembly.

9. A device according to claim 8, in which the matching transistor has a gate area greater than an area corresponding to a sum of the main areas of several elementary detectors of a given sub-assembly.

10. A device according to claim 1, in which the interconnections, each connecting the impedance-matching device to an elementary detector, are of roughly identical dimensions.

11. A device according to claim 1, in which at least one interconnection has its resistance increased or reduced, compared to the resistance which it would have had if it connected the elementary detector to a given terminal of the impedance-matching device by as short as possible a path in microelectronics technology, and where at least one elementary detector is further from the terminal of the impedance-matching device than another elementary detector of the same sub-assembly.

12. A device according to claim 11, in which at least one interconnection of a given length, connecting the impedance-matching device to an elementary detector, has, over at least a part of its length, a section different from at least a part of another interconnection connecting the impedance-matching device to another elementary detector of the same sub-assembly.

13. A device according to claim 12, in which the interconnection, connecting the impedance adaptation device to an elementary detector, having an increased resistance and a given length, has a narrowing of its section over at least a part of its length.

14. A device according to claim 1 in which, with the elementary detectors being arranged in a matrix including lines and columns of elementary detectors, the sub-assembly includes different elementary detectors located over several lines and different elementary detectors located over several columns of the matrix.

15. A device according to claim 1, in which the elementary detectors of a given sub-assembly are arranged with an axial symmetry of a given order.

* * * * *